United States Patent [19]

Kantor

[11] Patent Number: 4,469,596
[45] Date of Patent: Sep. 4, 1984

[54] FLUID TRANSPORT CONDUIT SYSTEM IN EQUILIBRIUM WITH ITS ENVIRONMENT

[76] Inventor: Frederick W. Kantor, 523 W. 112th St., New York, N.Y. 10025

[21] Appl. No.: 423,524

[22] Filed: Sep. 27, 1982

[51] Int. Cl.³ .............................................. C02C 1/02
[52] U.S. Cl. .............................. 210/137; 137/236 R; 210/170; 210/220; 210/921
[58] Field of Search .............. 210/170, 173, 603, 614, 210/741, 758, 220, 137, 920, 921; 137/236 R

[56] References Cited

U.S. PATENT DOCUMENTS

| | | | |
|---|---|---|---|
| 2,025,722 | 12/1935 | Camp | 210/170 X |
| 3,491,023 | 1/1970 | McCormick | 210/170 |
| 3,651,646 | 2/1972 | Grunau | 210/170 X |
| 3,674,687 | 7/1972 | Quase | 210/170 X |
| 4,225,434 | 9/1980 | Ernst et al. | 210/137 X |
| 4,360,427 | 11/1982 | Posgate | 210/170 |
| 4,370,227 | 1/1983 | Michael | 210/170 |

*Primary Examiner*—John Adee
*Attorney, Agent, or Firm*—Curtis, Morris & Safford

[57] ABSTRACT

A conduit system for transporting municipal or industrial wastes economically and efficiently is shown. The conduit system comprises a conduit which is located within a body of water and which has a thin, flexible wall adapted to maintain the contents of the conduit in pressure equilibrium with the body of water in which the conduit is situated. By maintaining pressure equilibrium or a slightly higher pressure within the conduit, it is possible to make substantial savings in materials of construction; and by locating the conduit within a body of water, substantially less cost is incurred for right of way. The thin, flexible wall of the conduit maintains the pressure equilibrium whether the conduit is ballasted to the bottom of the body of water or supported at an intermediate location by buoys. Liquids or liquids with entrained solids are transported through the conduit by flow augmentation means positioned at intervals along the length of the conduit. Desirably, these flow augmentation means comprise axial or centrifugally acting impellers adapted to shred debris typically found in municipal or industrial waste. The internal surface of the conduit may be provided with helical flutes or similar contours to impart a swirling motion to the fluid passing therethrough.

31 Claims, 39 Drawing Figures

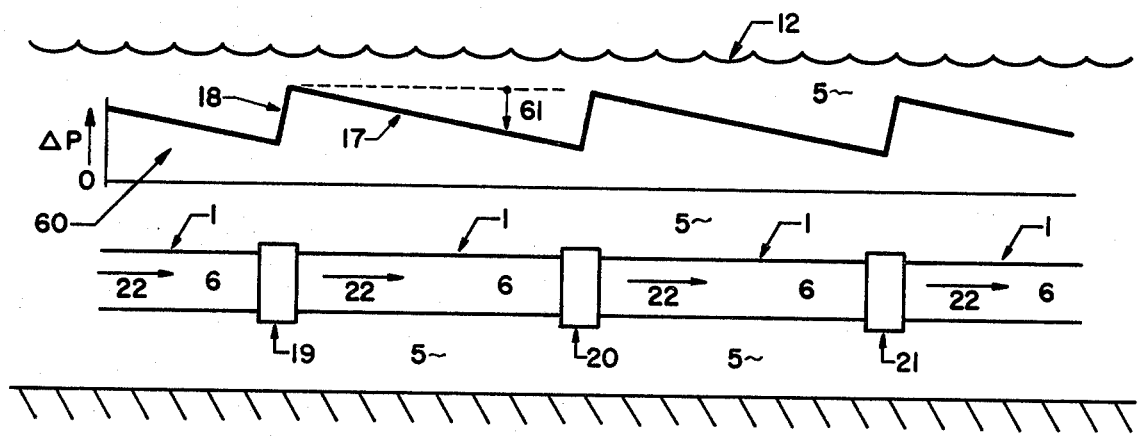
FIG. 5
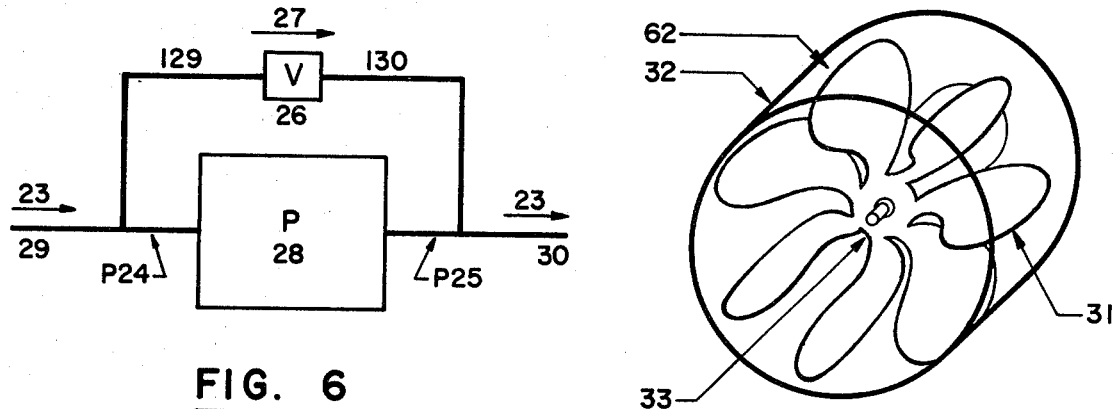
FIG. 6
FIG. 7
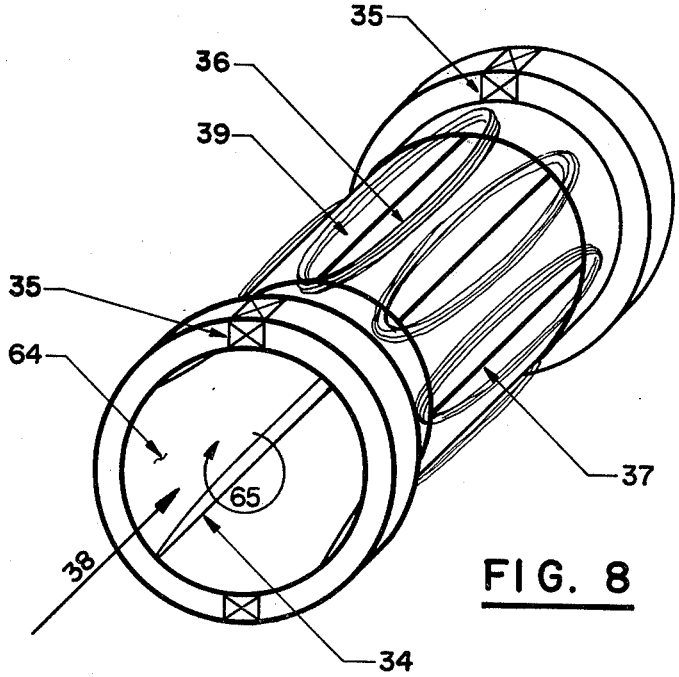
FIG. 8

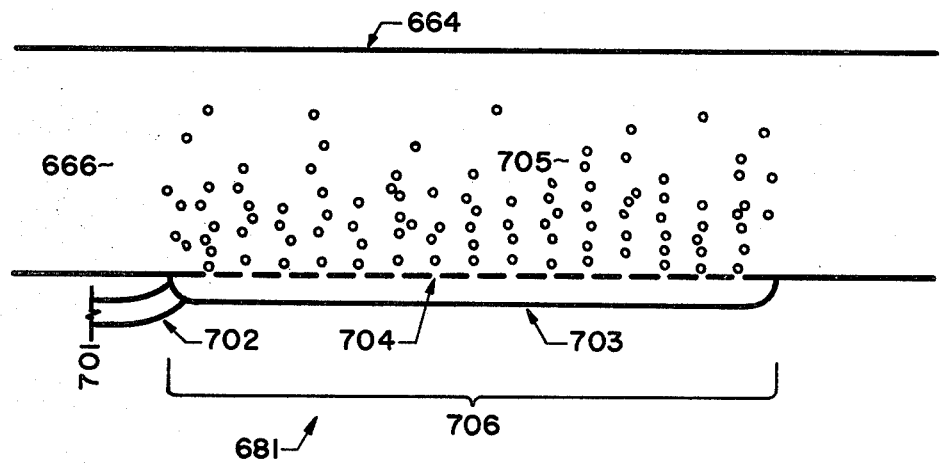
FIG. 37
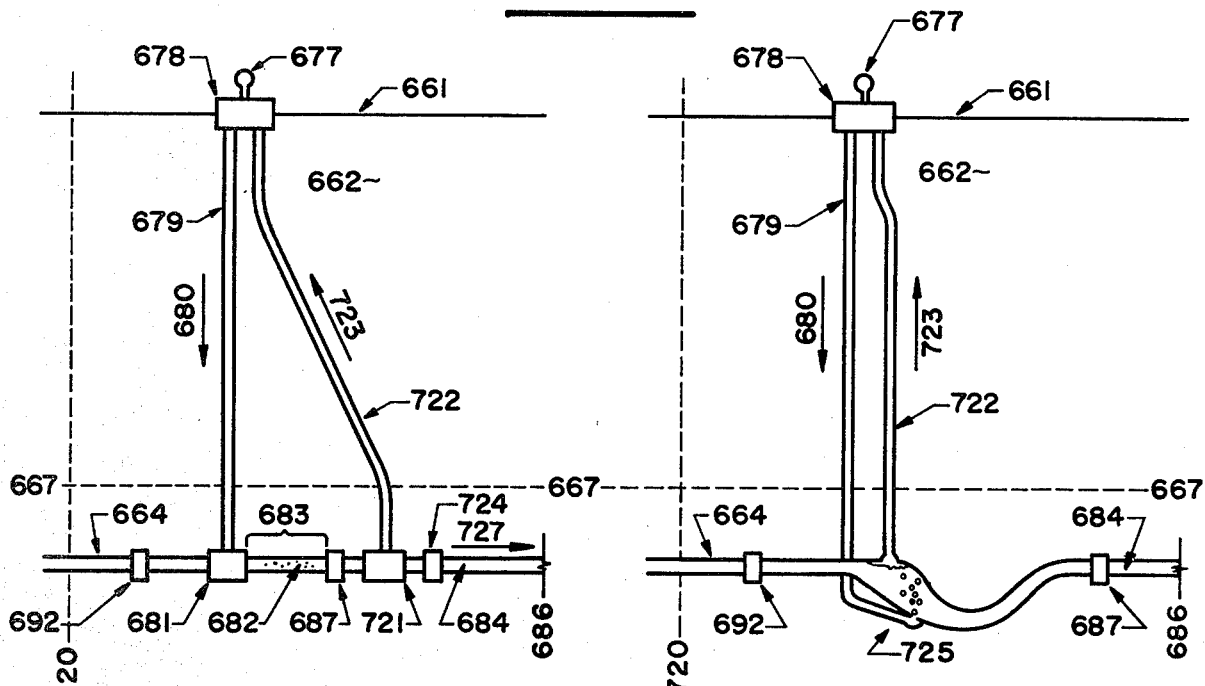
FIG. 38
FIG. 39

FLUID TRANSPORT CONDUIT SYSTEM IN EQUILIBRIUM WITH ITS ENVIRONMENT

TABLE OF CONTENTS

I. FIELD OF INVENTION
II. RELATED PATENT APPLICATIONS
III. OBJECTIVES OF THE INVENTION
IV. SUMMARY OF THE INVENTION
V. DESCRIPTION OF THE DRAWINGS
VI. DETAILED DESCRIPTION OF THE INVENTION
  A. Fluid Equilibrium
  B. Fluid Equilibrium in an Equiduct
  C. Small Net Positive Internal Pressure to Shape Equiduct Wall
  D. Ballasted Equiduct
  E. Equiducts to Carry Suspended Solids
  F. Flow Augmentation
  G. Augmented Flow Equiduct System
  H. Safe Flow Augmentation: Control
  I. Flow-By During Failure of Augmentation Means
  J. Safe Flow Augmentation Station with Separate Flow-Through Means
  K. Axial Impeller Flow Augmentation Means: Intrinsic Flow Through
  L. Avoiding Impeller Fouling While Pumping Suspended Solids: Debris Shedding Through Impeller Central Region
  M. Bumpers and Coatings to Control Effects of Debris
  N. Pneumatic Debris Bumpers
  O. Contoured Impeller to Shed Debirs at Periphery: Optionally Placed in Throat
  P. Using Energy in Swirling Flow
  Q. Liquid Entrainment
  R. Changing Flow Velocity During Flow Augmentation
  S. Changes in Diameter Without Flow Energy Augmentation
  T. Varying Diameter Control ΔP
  U. Cascading Flow Augmentation Means
  V. Housings for Axial Flow Augmentation Means
  W. Removal of Flow Augmentation Means for Maintenance
  X. Removing Flow Augmentation Means Without Polluting Ambient
  Y. An Example of ΔP Measurement for Control: A Safe Flow Augmentation Station
  Z. Flow Augmented Equiduct System
  AA. System Operation with a Failed Flow Augmentation System
  BB. Communication Among Flow Augmentation Stations
  CC. Spacing of Flow Augmentation Means in an Equiduct System: A Safely Augmented Equiduct
  DD. Direction and Magnitude of Swirl: Conversion of Swirl to Driving Pressure
  EE. Gate Valve Means with Equiduct
  FF. Equal Input Velocity Flow Merging Means
  GG. Variable Flow Ratio Merging
  HH. Variable Geometry Merges
  II. Use of Other Merges
  JJ. SPDT Slide Valve for Equiducts
  KK. An Example of a General Flow Introduction, Augmentation, and Control Station
  LL. Flow Augmentation and Control Station
  MM. Momentum Change During Valving
  NN. Gravity Feeds
  OO. Stiff Equiduct Wall for Some Gravity Feeds
  PP. Instrumentation of Merge, Flow Augmentation, and Control Station
  QQ. Mulitple Inlet Parallel Equiduct Feeding Merge Station
  RR. Flow Retardation with Energy Recovery
  SS. Externally Accessible Lubrication
  TT. Flushing to Clear Leading Edges and Seals
  UU. Free-Spinning Impellers if Drive Fails
  VV. Magnetic Assist to Extend Bearing Life
  WW. Chemical Additives to Reduce Impedence to Flow
  XX. Inspection and Access Ports
  YY. Over-Pressure Relief: Resealing in Debris Transport Systems
  ZZ. Gas Segregation
  AAA. Gas Segregation and Solids Transport
  BBB. Gaseous Phase Flushing and Gas Introduction for Solution
  CCC. Gas Introduction and Solution at Depth
  DDD. Gas Segregation in a System: Gas Collection
  EEE. Segregated Gas as Fuel for Pumping or Power
  FFF. Segregating Inlet Gas
  GGG. Controlling Gas Outlet Ports of Gas Segregators to Avoid Liquid in Gas System
  HHH. Gas Segregation and Impact or Cavitation Wear Rate of Gas Evolution in an Equiduct
  III. Rate of Gas Evolution in an Equiduct
  JJJ. Entry Gate
  KKK. Controlled Buoyancy of Gas Segregation Stations
  LLL. Locatiion at Intermediate Depth to Reduce Disturbance of Other Installations
  MMM. Centrifugal Pumping Flow Augmentation Means
  NNN. High Pressures Readily Obtained: Slurry Transport
  OOO. Centrifugal Flow Retardation Means
  PPP. Example of Centrifugal Flow Augmentation Means
  QQQ. Partially Axial, Partially Centrifugal Flow Augmentation Means
  RRR. Drag of Failed Centrifugal Flow Augmentor
  SSS. Efficient Use of Space for Installed Centrifugal Flow Augmentation Means
  TTT. Flow Augmentation by Evolution of a Gaseous Phase
  UUU. Rising Bubbles to Drag Liquid with Them
  VVV. Gas Segregation to Remove Bubbles
  WWW. Liquid Return to Depth
  XXX. Optional Gas Introduction
  YYY. Positioning Instrumentation and Control
  ZZZ. Gas Segregation in an Equipond
  AAAA. Advantages of Obtaining High Pressure in Equilibrium Vessels by Depth
  BBBB. Flow Augmentation from Biological Activity Gas Product(s)
  CCCC. Control of Electrical Charge for Safety
  DDDD. Gas Introduction Return Sometimes Unnecessary EEEE. System Designation
FFFF. Gas Introduction Station
GGGG. Deep Gas Introduction with Removal of Some of Gaseous Material
HHHH. Gas Introduction Ports and Means
IIII. Flow Augmentation by Depth Changes at a Substantial Depth
JJJJ. Equiduct for Gas and Liquid Contacting
KKKK. Miscellaneous Flow Augmentation Means
  (1) Jet Pumps
  (2) Piston Pump
  (3) Diaphragm Pumps
  (4) Peristaltic Pumps
  (5) Surface Wave Pumps
  (6) Water Turbine Actuated Pumps
  (7) Heat Engine Actuated Pumps
LLLL. Defouling by Water Jet
MMMM. Varying Flow Velocity
NNNN. Optional Inclusion of Junctions
VII. SUMMARY

I. FIELD OF THE INVENTION

This invention relates to the transporting of wastes from their sources through a conduit system located within a body of water. More specifically, this invention relates to the transporting of municipal and industrial waste streams in a flexible wall conduit, the contents of which are in pressure equilibrium with the water in a river or stream or other body of water, wherein operating expenses and installation costs are substantially reduced. Even more specifically, this invention relates to the configuration of conduit systems and their flow augmentation means for conducting, merging and processing the flow of waste.

II. RELATED PATENT APPLICATIONS

In my four copending patent applications, identified below, I have described apparatus and methods for use in conjunction with systems of the type described in this application. To simplify reference to those copending applications, I will hereinafter designate them as follow: My patent application entitled "Fluid Transport Conduit System in Equilibrium with Its Environment: Conduit Configuration," (hereinafter, "*2"), pertains primarily to means for constructing, installing, and insuring the dynamic stability of conduits and vessels for use in systems of this class. My patent application entitled "Instrumentation and Control System for Fluid Transport and Processing System," (hereinafter "*3"), pertains primarily to instrumentation for measuring the properties of systems of this class for the purpose of operation, preventive maintenance, and research. My patent application entitled "Apparatus and Method for Processing Wastes," (hereinafter "*4"), pertains primarily to apparatus and methods for processing sewage, solid wastes, and thermal pollution, for systems of this class. My patent application entitled "Fluid Transport and Processing System and Method," (hereinafter "*5"), pertains primarily to a sewage transport system for removing liquid and solid wastes from points along a natural waterway and transporting and processing these wastes. The disclosures of my foregoing copending patent applications hereby are incorporated herein by reference.

III. THE OBJECTIVES OF THE INVENTION

It is a primary object of this invention to provide a sewage transport system for use in artificial or natural waterways which substantially reduces the costs incurred in acquiring rights of way and constructing a conduit system on land.

It is a related object of this invention to provide a conduit system for municipal and industrial wastes which may be submerged in a body of water and thereby take advantage of the pressures encountered at depths therein.

It is a further and related object of this invention to provide a submerged conduit system in which wastes can be transported and simultaneously processed, which is safe and which efficiently uses the energy imparted to the transported wastes via pumping systems or natural flow.

IV. SUMMARY OF THE INVENTION

The foregoing several objects and other objects of this invention are achieved in a conduit system which comprises a conduit, positioned within a body of water and having a thin, flexible wall adapted to maintain the contents of the conduit in pressure equilibrium with the body of water surrounding it. By maintaining the pressure equilibrium or a slightly higher pressure within the conduit, it is possible to make substantial savings in materials of construction; and by locating the conduit within a body of water, substantially less cost is incurred for right of ways. The details of the conduit, its flow augmentation means, instrumentation and other features which contribute to safe, efficient operation are summarized in the Abstract of the Disclosure and reference may be made thereto.

V. DESCRIPTION OF THE DRAWINGS

FIG. 5 is a schematic view of an equiduct with flow augmentation means spaced therein and including a graph depicting the pressure differential between the inside and the outside of the equiduct as a function of position along its length;

FIG. 6 is a schematic diagram of a safe flow augmentation system;

FIG. 7 is a partially schematic, partially elevation view of a simple impeller device for use in a safe-flow augmentation system;

FIGS. 8 and 9 are schematic, partially elevation and end views, respectively, of an alternative flow augmentation means;

FIG. 37 is a schematic view of an equiduct having a gas introduction station;

FIG. 38 is a schematic view of an aeration system for an equiduct; and

FIG. 39 is a schematic view of an alternative form of aeration station.

VI. DETAILED DESCRIPTION OF THE INVENTION

A. Fluid Equilibrium

In a liquid medium the pressure of the liquid depends upon the depth, and increases with depth. If, within such a liquid medium, there is contained another body of liquid of the same density, the pressure within that contained body of liquid also increases in the same way with depth. For this reason, a membrane separating these two bodies of liquid from each other does not have a net pressure acting across it, regardless of the depth within the bodies of liquid. For this reason, a membrane separating these two bodies of liquid does not have to have the structural strength which would be required if either the contained body of liquid were supported in the absence of an external supporting medium, or the external liquid were supported in the absence of a contained medium exerting a back pressure. Use of this principle of fluid equilibrium permits the construction of containers and conduits for liquid which, when surrounded by liquid, need only a small fraction of the strength which might otherwise be required. Such liquid-liquid equilibrium systems may be made much more economically than stronger containers.

In order to take advantage of the reduced strength permitted by the use of liquid-liquid equilibrium, it is desirable to design systems in which other types of pressure exerted within or outside the liquid-liquid equilibrium membrane walls are not so large as to themselves require a degree of strength which would obviate the advantages derived from equilibrium construction. For example, were a conduit system constructed to transport liquid internally while surrounded by a liquid medium, any augmentation of the flow of liquid within such a conduit, provided for example by pumping means, should make allowance for keeping the difference in pressure between the inside and outside of the equilibrium conduit small enough so as not to make the strength requirements of the conduit excessive. In practice, this may make it advantageous to space flow augmentation means relatively closely along the length of such a conduit, and also to provide flow augmentation means which, in event of their failure, would not cause substantial back pressure to be developed in the fluid presented to them at their inlets. To simplify discussion, hereinafter, "equiduct" will be used to mean an equilibrium conduit or duct means for carrying a liquid in the presence of a liquid medium, and using the equilibrium between liquid pressure external and liquid pressure internal to the duct to reduce the strength requirements thereupon.

B. Fluid Equilibrium in an Equiduct

Figure 1:
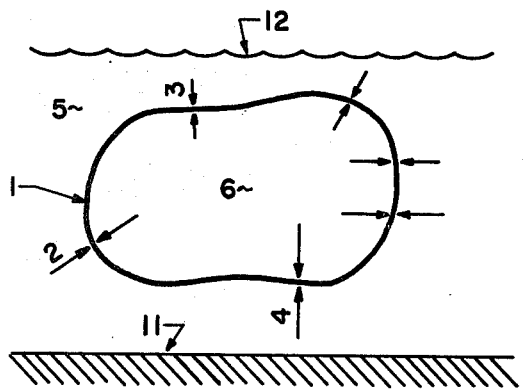
FIG. 1 is a schematic, cross section view of a conduit having a flexible membrane wall, containing liquid at the same pressure as the surrounding liquid medium.

In FIG. 1, 1 designates a membrane separating an internal liquid, 6, from an ambient liquid, 5, whose surface is depicted by 12 and whose bottom by 11. Arrows 2, 3 and 4 of the arrows directed inside and outside membrane 1 depict forces acting thereupon exerted by liquids 6 and 5. The length of these arrows is intended to depict approximately the dependence of the force exerted upon the depth within the liquid. Each of these pairs of arrows denotes substantially equal and opposite force in the case of thin membrane, so in the case in which fluids 6 and 5 have identical density there could be no net force tending to deform membrane 1. The increased length of the pairs of arrows with increasing depth is intended to depict schematically the increase in pressure with depth due to the action of the earth's gravitational field upon liquids 5 and 6. Membrane 1 can be thought of as a cross-section through a partially collapsed conduit means which is in equilibrium with its surroundings. It is the substantially complete cancellation of internal and external liquid forces which permits the reduction in tensile strength for membrane 1, and which results in the reduction of the structural requirements for such systems, as described more fully hereinafter.

C. Small Net Positive Internal Pressure to Shape Equiduct Wall

Figure 2:
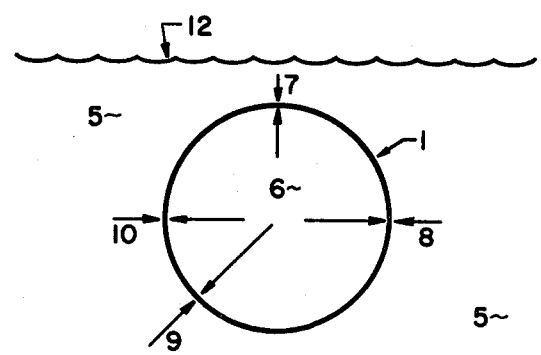
FIG. 2 is a schematic, cross section view of the conduit of FIG. 1 containing liquid at a higher pressure than the liquid medium.

In FIG. 2 is depicted a cross-section for an equiduct containing a liquid 6 presumed to have the same density as a surrounding liquid 5. Equiduct 1, as shown, is filled to a pressure slightly higher than its surroundings. This is depicted in arrow pairs 7, 8, 9 and 10. As in FIG. 1, the length of the arrows is intended to illustrate schematically the relative pressure within and without membrane 1. In these, the difference in pressure between the inside and the outside of membrane 1 is substantially independent of the depth within liquid 5. However, the total pressures exerted by liquids 5 and 6 depends upon depth. The same cancellation which led to the independence of depth (in FIG. 1) of the pressures acting upon membrane 1 here would make the net difference in pressure between the inside and the outside of membrane 1 independent of depth. In the absence of other constraints, the circular cross section is the one which is naturally assumed by a uniform flexible membrane in the presence of an internal pressure greater than its external pressure.

D. Ballasted Equiduct

Figure 3:
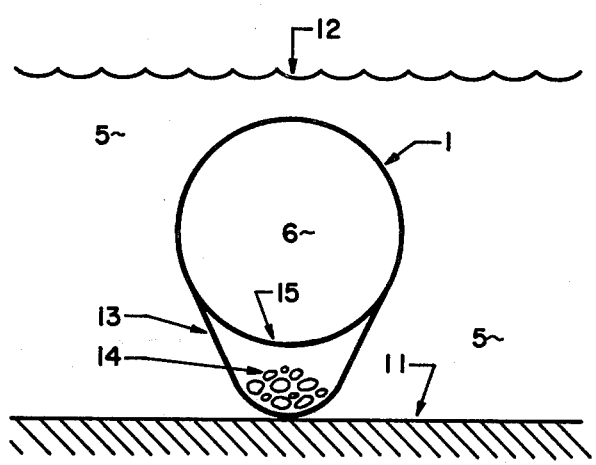
FIG. 3 is a schematic, cross section view of a conduit containing liquid at a slightly higher pressure than the surrounding liquid medium; the liquid is of lower density than the surrounding medium and the conduit includes provision for ballasting.

FIG. 3 depicts an equiduct in a system in which internal liquid 6 has a density different from that of surrounding liquid 5. As one way to provide for the placement of such an equiduct, an additional region, 13, is shown appended and filled with a suitable ballast material, 14. A continuation of membrane 15 supports internal pressure within the ballasted equiduct. Were the density of liquid 6 different from that of liquid 5, the shape assumed by membrane 1 under internal pressure would not necessarily be circular. If liquid 6 had a higher density than liquid 5, it would tend to settle and tend to produce a flattening near the bottom region. In such a case, ballast might not be necessary where liquid 6 is less dense than liquid 5. Ballast 14 in ballast-containing membrane 13 would tend to weight the equiduct at the bottom, so that liquid 6 in membrane 1 would cause it to form a more nearly teardrop shape, slightly elongated in the vertical direction. However, for most applications these deformations of flexible membrane 1 would be expected to not interfere with the principles of operation which allow using a flexible membrane of substantially reduced structural requirements compared to those required in the event that surrounding fluid 5 were absent. Structure, buoyancy and positioning are discussed further in my copending application #2.

E. Equiducts to Carry Suspended Solids

Figure 4:
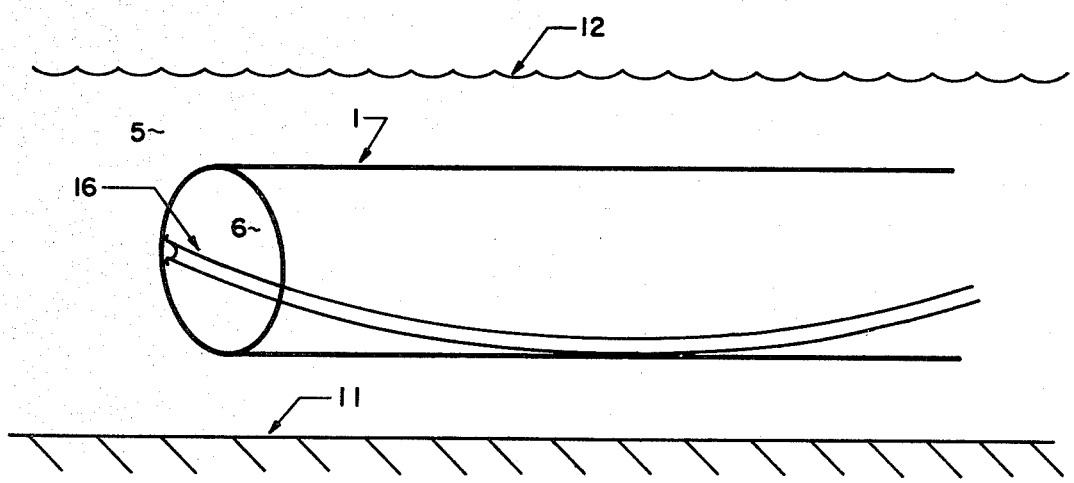
FIG. 4 is a part cross-sectional, part elevation view of an equiduct containing internal fluting.

For some applications, for example, in transport of certain types of sewage, it may be desirable that the liquid flowing with an equiduct be so handled as to allow it to contain, in suspension, particulate or fibrous matter of a type which might tend to settle out or rise. In FIG. 4 is depicted, partially schematically, a view of an equiduct 1 with internal and external liquids, respectively 6 and 5 as in previous figures, with the addition of a helical flute 16 which may be used as a single flute or which may be used as one of a multiplicity of flutes spaced around the internal wall of membrane 1 of the equiduct, which flutes may be continuous or as many shorter fluted positions. Such an internal flute or flutes 16 would tend to swirl liquid 6 as it progressed axially along equiduct 1. This swirling motion could be designed to retain in suspension particulate or other matter. For this reason, such an internally fluted equiduct may be especially suited to applications in transport of sludges. An example of a situation in which a sludge might be produced is in the processing of raw sewage. The processed sewage may be returned to a naturally occuring body of water; however, nutrient materials which have been removed from it during processing may in some cases be undesirable additives to the body of water, in that they would provide adequate nutrient addition to allow eutrophication and deterioration of the body of water. A fairly highly concentrated sludge from a processing plant might thus be found in a geographic location from which its removal by an equiduct system could be especially convenient. More detail on such applications is set forth in my copending patent applications #2, #4 and 190 5.

F. Flow Augmentation

For applications in which a fluid were to be transported over long distances and in which the natural slope which can be imparted to the equiduct were insufficient to provide proper flow of the fluid therein, additional flow augmentation means may be desirable. Were a suspension or sludge to be transported within an equiduct, such flow augmentation means could be more desirable than they might otherwise be for a single fluid. A flow augmentation means can be thought of as a pump or compressor. What it serves to do is actuate the motion of fluid 6 within some conduit 1. In the event that this pumping action were concentrated in a small distance along the conduit, for example, were it preformed within a relatively compact pumping station, the liquid 6 within a conduit leaving such a pumping system would be a a higher pressure with respect to its ambient than the liquid 6 entering such a pumping system with respect to its ambient or at higher absolute pressure were both inlet and outlet at the same depth within a surrounding liquid 5. For purposes of this discussion, it is assumed that pumping is to be performed at approximately a constant depth, and that the density difference between liquid 6 and liquid 5, internal and external to the equiduct, is sufficiently small so that it would be relatively undesirable to utilize this density difference in a flow augmentation process, as is suggested, for example, by J. S. Conner, U.S. Pat. No. 3,467,013, Sept. 16, 1969. This assumption is made to simplify the discussion: the more general case is more easily obtained by adding a term rho (pgh) to each pressure (p=density of liquid in question; g=gravity; and h-height of liquid above measurement point).

G. Augmented Flow Equiduct System

In FIG. 5 is depicted, partially diagrammatically and partially schematically, an equiduct 1 containing a liquid 6 presumed to be of approximately the same density as a surrounding liquid 5 and flowing within equiduct 1 in the direction designated by arrows 22. Spaced along the length of equiduct 1 are flow augmentation means 19, 20 and 21, possibly of a larger set, the rest of which are not shown. Graph 60 depicts schematically the difference in pressure between the inside and the outside of equiduct 1, labeled ΔP. At each flow augmentation means this difference in pressure is increased, as represented schematically by line segment 18. Between flow augmentation means, the flow of liquid 6 within equiduct 1 is subject to frictional forces, resulting in a decrease in pressure as the fluid moves along the length of the equiduct, as represented schematically by line segment 17.

H. Safe Flow Augmentation: Control

Several features of such a flow augmented equiduct may benefit from more detailed consideration. First, each flow augmentation means can produce a pressure increment in the desired direction of flow, 22, when it is operating correctly. However, in the absence of any control based on measurement of flow rate or the pressure difference, $\Delta P$, were the flow in the direction 22 to become quite small, the amount of drop, designated by 61, corresponding in this case to the pressure drop represented by line segment 17 in graph 60, might become quite small. For this reason, successive flow augmentation stations 19, 20, 21, etc. might, in the absence of adequate flow, produce an undesirably large total $\Delta P$ by each adding to the previous $\Delta P$. Fortunately, $\Delta P$ measurements can be made quite readily at each flow augmentation station, for example, by means of a small dimple in flexible membrane 1 of the equiduct, or by means, some of which are discussed more fully in my copending application *3.

I. Flow-By During Failure of Augmentation Means

Another feature is that the flow augmentation means could be placed close enough to each other so that failure of one would not result in such a large pressure drop as to make the flow in the system ineffective; that is, preceding flow augmentation means could suffice to drive fluid 6 past a failed flow augmentation station, for example, 20. By including in each flow augmentation station a pumping capability sufficient to produce a larger increase in $\Delta P$ than the drop associated with the flow of liquid 6 to the next pumping station, it would be possible to maintain a reserve pumping capacity distributed along the equiduct. For such a fail-safe system to be effective, it could be desirable that each pumping station be so designed that its failure would not introduce a large impedance to the flow of working fluid past it.

J. Safe Flow Augmentation Station with Separate Flow-Through Means

In FIG. 6 is depicted schematically a class of pumping stations which could utilize essentially any standard pump means 28. Liquid enters such a pumping station at 29 in the direction of arrow 23 and leaves at 30 in the direction of arrow 23. Pressure P24 is presumed under normal operation to be less than pressure P25. One way valve mechanism 26 under such circumstances prevents the flow of liquid from 130 back toward 129. That is, the flow of liquid in the branch including valve mechanism 26 would be zero during normal functioning. In event of failure of pump 28, fluid entering at 29 could pass through valve 26 in the direction of arrow 27 and leave the system at 30. Incorporation of such a valving mechanism would be desirable for a fail-safe system, in the event that pump means 28 does not have any blowby feature in its construction which would allow liquid to pass through it with relatively little impedance in the event of failure, and consequently relatively little pressure drop.

K. Axial Impeller Flow Augmentation Means: Intrinsic Flow Through

In FIG. 7 is depicted schematically a simple impeller flow augmentation means. This class of flow augmentation means has the desirable feature that in the event of failure it would not introduce a substantial pressure drop for liquid flowing through it. In this flow augmentation means is a rotor, generally designated 62, with blades 31, a hub 33 which could, for example, contain a suitable motor for actuating the rotation of the rotor, and a housing 32. For many applications, such a simple flow augmentation means would be desirable as a fail-safe type of pumping mechanism. Such an impeller pumping mechanism would not require the use of an additional valve mechanism, as 26, in FIG. 6. For many types of applications involving the pumping of a single fluid or mixed fluids, such a simple impeller could be suitable. However, for some applications, especially those involving the pumping of a suspension containing fibrous material, an impeller of the type shown in FIG. 7 might have an undesirable tendency to become fouled, for example, by accumulating fibrous material on the leading edges of the blades.

Figure 9:
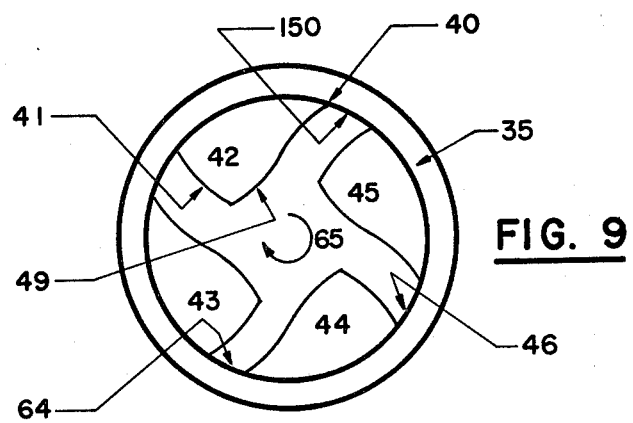

L. Avoiding Impeller Fouling While Pumping Suspended Solids: Debris Shedding Through Impeller Central Region In FIG. 8 is depicted another fail-safe flow augmentation means, intended specifically to avoid problems associated with fouling by fibrous material, as might be anticipated, for example, in the pumping of unprocessed sewage in an equiduct system. In FIG. 8, liquid is presumed to flow in the direction of arrow 38. In this flow augmentation system, a set of spiralled slanted impeller blades, 34, are mounted with a sleeve 64. This sleeve is supported at both ends by suitable bearings 35. Its rotation in direction 65 is driven by a suitable induction motor comprised of stator 39, windings 36, and inductive reaction windings or bars 37 mounted upon sleeve 64. In FIG. 9 is an end view of the flow augmentation means depicted in FIG. 8. In FIG. 9 impeller blades 42, 43, 44, and 45 spiral back from the viewer in a counterclockwise direction. When the entire sleeve 64 is rotated in direction 65 fluid progresses away from the viewer. On impeller blade 42 are labeled leading edge 49, trailing edge 41, and junction point 40, where the leading edge joins at a gentle angle to internal surface 150 of sleeve 64. In this design, the leading edge of the impeller blade may be made to have a very gentle angle with respect to the flow of working fluid 38. By this means, the accumulation of debris upon the leading edge might be greatly reduced. The absence of a central junction among the various impeller blades allows debris to be shed by the leading edges through the central open area. Of course, an external induction motor type of drive might be used with a simple impeller of the type depicted in FIG. 7, with an external cage on the impeller to carry the induction-repulsion rotor. However, such an external induction motor drive might be especially advantageous in a configuration as depicted in FIGS. 8 and 9, in which it could help the central region of the flow augmentation means to be left entirely open to facilitate shedding of debris.

By suitable choice of design variables, including frequency, number of phases, spacing between the various coils in the stator, and spacing of inductive-repulsion bars in the rotor, induction drive 39, 36 and 37 could be made to rotate the flow impeller at a suitable angular velocity, depending upon the pumping requirements for the pumping station. Solid state electronic devices, for example, exist which could relatively economically provide for the generation of polyphase power suitable for operation of such an induction drive. Alternatively, a system based on magnetic sensing, for example, using Hall effect devices might be utilized in a way analogous to conventional brushless D.C. motors in use today. In that case, induction windings or bars 37 might be replaced by suitable magnetic or magnetizable structures.

M. Bumpers and Coatings to Control Effects of Debris

The leading edges of the impeller blades in any such system could be made of a suitable soft material to reduce or avoid damage by impact, and/or could be treated or coated in a way to reduce the coefficient of friction and facilitate shedding, for example, by coating with fluorethylene polymer or polytetrafluorethylene. Materials for producing such coatings are commercially available from DuPont Company, and are used for coating saw blades and other such surfaces for lubrication, and for coating frying pans and other cookware. Such coatings are characterized both by inertness and by low coefficient of friction. Many other suitable coatings are available.

N. Pneumatic Debris Bumpers

An impeller designed for transporting solid debris in which large chunks of solid matter appeared could be designed utilizing a bumper as the leading edge of the impeller. Suitable bumpers might be constructed using pneumatic, inflated, composite material systems analogous to slender tires of the type used on bicycles, or for heavier applications, of the type used on automobiles.

O. Contoured Impeller to Shed Debris at Periphery; Optionally Placed in Throat

Figure 15:
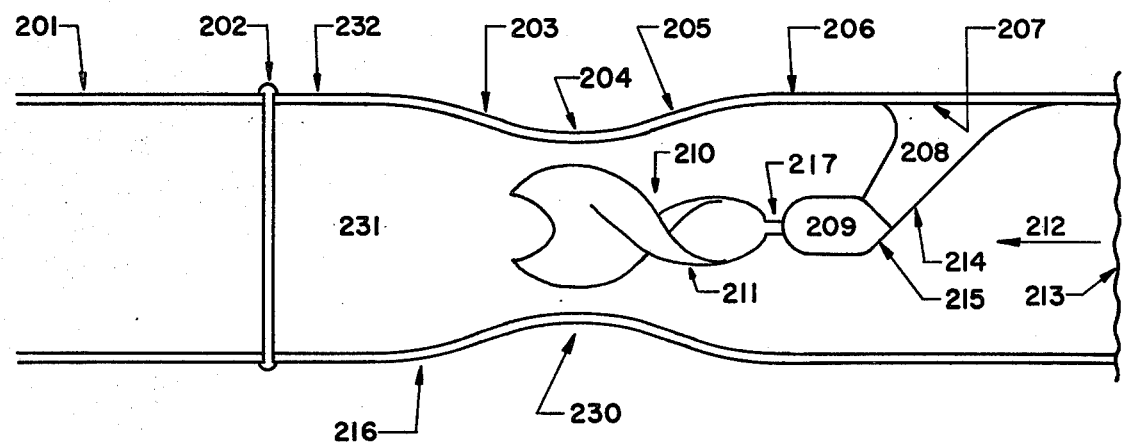
FIG. 15 is an elevation view of an alternative form of safe flow augmentation means.

In FIG. 15 is set forth an alternative form of safe flow augmentation means. This form might be specially desirable were the flow velocity of liquid medium within the flow augmented conduit sufficiently small as to make efficient coupling of mechanical energy for an impeller into the moving liquid relatively more effectively accomplished at a higher velocity than that of the average flow within the conduit means itself. In order to accomplish the effective mechanical coupling of energy from the impeller into the moving liquid 231, a housing shaped generally into the form of a venturi might be used. This housing is generally designated 230. It connects at its outlet end to equiduct 201, through a joint represented schematically by 202. It receives fluid 231, moving in the direction 212, from a junction and equiduct or other portion of the system, not shown, on the other side of break line 213. 216 designates the contoured wall forming venturi system 230. Wall 216 has regions 206 representing a uniform diameter inlet region, 205 the constriction entering the throat, 204 the narrowest point of the throat, 203 the expansion region leaving the throat, and 232 an essentially uniform cross-section region downstream from expansion region 203. Actuating flow within this safe flow augmentation means is, in this example, a particular configuration of flow augmentation impeller design to avoid accretion of debris in systems in which a fluid carrying debris were to be transported. Of course, other types of impeller could be used. This debris-shedding system consists of a contoured support 208, with slanted leading edge 214 whose angle of presentation to entering fluid moving in direction of arrow 212 is selected so as to promote shedding of debris. Support 208 is anchored at its root 207 to a suitable portion of wall 216. Support 208 supports a motor 209 in a suitably contoured housing 215, also designed to facilitate shedding of debris. The shaft of this motor 217 bears an impeller, generally designated 210, specially contoured so that its leading edge 211 progresses in a gentle spiral pattern radially outward and axially along the direction of motion, to provide a gentle angle of incidence with respect to the working fluid moving relative thereto. This impeller would not fill throat 204; adequate space would be left to allow debris to be shed past the impeller.

P. Using Energy in Swirling Flow

Figure 16:
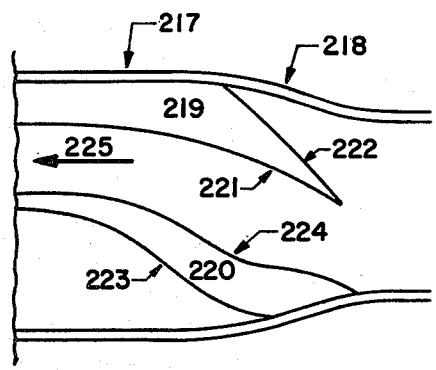
FIG. 16 is an elevation view of an alternative form of conduit divergence including spiral flutes.

Liquid passing impeller 210 may acquire a swirling motion in reaction to the motion of this impeller. In FIG. 16 is shown an alternative form of divergence region 203 and uniform cross-section region 232 of venturi 230. These are, respectively, divergence region 218 and uniform cross-section region 217. This alternative divergence and uniform section contains a set of flutes or blades, smoothly merged into the wall of the divergence region. These blades, 219 and 220, are smoothly anchored at their roots, 222 and 223, to the inner surface of divergence region 218. Leading edges of these, 221 and 224, would present a sufficiently small angle to the direction of flow of fluid in the divergence region so as to avoid accumulating debris. These debris shedding flutes serve to convert some of the rotational motion imparted to the fluid by impeller 210 into more useful axial motion, so as to make the pumping process relatively more efficient.

Q. Liquid Entrainment

Figure 17:
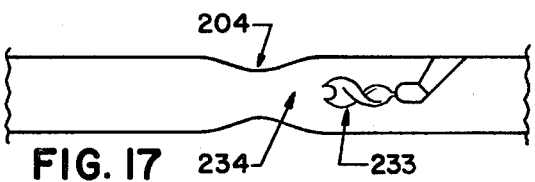
FIG. 17 is an elevation view showing a flow augmentation means wherein the impeller is located upstream from the throat region.
Figure 18:
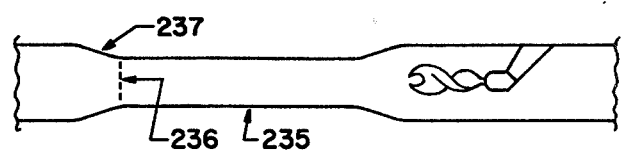
FIG. 18 is a view of the flow augmentation means of FIG. 17 showing a more extensive entrainment region.

It is not necessary for the impeller 210 to be located exactly within throat 204. Because of the spread, with entrainment, of the stream of fluid leaving an impeller, an impeller could be located somewhat upstream from the throat region. This is shown schematically in FIG. 17. In FIG. 17 impeller 233 is located with respect to throat 204 so that in the entrainment region 234 between the impeller and the throat the faster flow just expands to fill the throat before it has progressed downstream to the location of the throat. The throat 204 would not have to be a simple inflection point. It might, if desired, contain a more extensive entrainment region, as is shown schematically in FIG. 18. Were an entrainment process used, an extended throat, here designated 235, might be used to allow the entrained fluid to reach a more uniform velocity over the entire cross-section of the throat before it reaches the exit region of the relatively uniform cross-section region 235, here designated 236, to enter divergence portion 237. In this way, the hydrodynamics of the entrainment process may be controlled in a way which is different from inserting an impeller directly within a throat, or allowing only the entrainment which could occur before the fluid entered a throat having a relatively short region of narrow diameter. In such an extended entrainment region could be incorporated additional flutes contoured to shed debris if desired, designated 238. These flutes are optional; they could be used for the same purpose as the flutes discussed in connection with FIG. 16, to convert some of the swirling motion, or rotary motion, imparted to the liquid by the impeller into a more useful axial motion.

R. Changing Flow Velocity During Flow Augmentation

Figure 19:
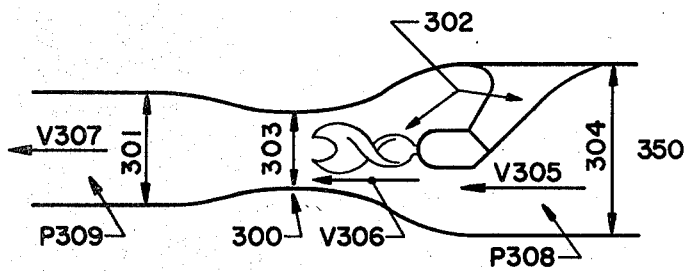
FIG. 19 is an elevation view of a flow augmentation means in combination with a throat whose final diameter is different from its initial diameter.

In FIG. 19 is depicted a flow augmentation means used in combination with a throat whose final diameter is different from its initial diameter. Fluid is let in at 350 with velocity V305, and pressure P308, conveyed within an equiduct with internal diameter 304. Flow augmentation means and its supporting assembly 302 is used to provide additional energy for the flowing fluid. This fluid leaves with velocity V307, and pressure P309, and is conveyed in a equiduct with internal diameter 301. As an intermediate stage, it passes with velocity V306 through region 303, in which is located the impeller of flow augmentation means 302, and which is the constriction of throat system 300. The inlet velocity here is smaller than the outlet velocity, and the inlet diameter 304 is greater than outlet diameter 301. The pressure P308 may be greater or less than P309. Neglecting friction and turbulence, if the amount of kinetic energy carried per unit mass of liquid when it is moving with velocity V307 substantially exceeds the sum of the amount of kinetic energy carried when it is moving with velocity V305 plus the energy added per unit mass by flow augmentation means 302 in the form of pressure or kinetic energy, then P309 will be less than P308. Otherwise P309 will be greater than or equal to P308. Another way of thinking of this is that part of the kinetic energy carried by the liquid moving with higher velocity as it leaves might be derived from the pressure energy of the liquid entering the system, and that if that is a source for the kinetic energy for liquid leaving the system, the overall pressure may drop during transit through the system. The flow augmentation means could more than make up for this drop in pressure, however.

S. Changes in Diameter Without Flow Energy Augmentation

Figure 20:
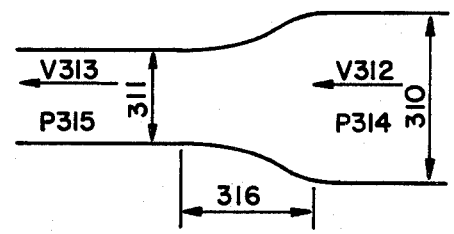
FIG. 20 is an elevation view of a constriction from a larger equiduct to a smaller equiduct.

In FIG. 20 is depicted a constriction from an equiduct with internal diameter 310 to an equiduct with smaller internal diameter 311. This constriction is a smooth transition region designated 316. Liquid entering it has velocity 312 and pressure P314. As it moves into a region of smaller cross section, the velocity increases so that it leaves with velocity 313 greater than that with which it entered. A region of this sort might be used, for example, in a transition to a smaller diameter equiduct. This would have a lower internal pressure for the same total energy and total fluid transport; with more of the energy of the moving fluid in the form of kinetic energy.

T. Varying Diameter Control ΔP

Figure 21:
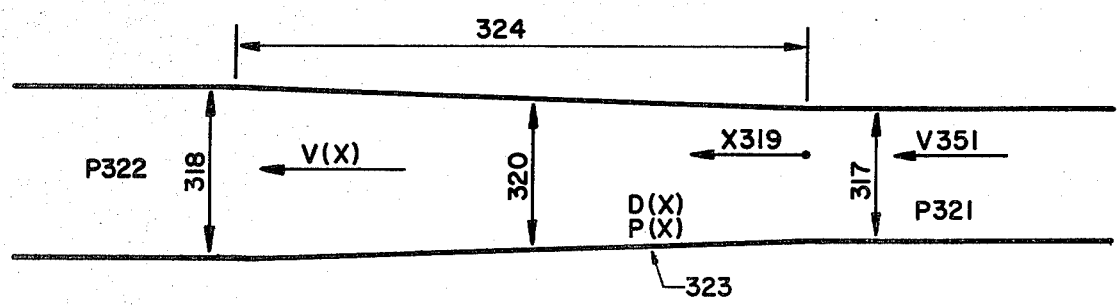
FIG. 21 is an elevation view of an expansion from a smaller equiduct to a larger equiduct.

In FIG. 21 is shown an embodiment which can be regarded as a reverse of FIG. 20. Here, fluid is let into an equiduct having internal diameter 317; the inlet fluid has pressure P321 and velocity V351. A coordinate X, 319, is defined. The diameter is a smoothly varying function (X). The velocity, therefore, is a function V(X), which for an incompressible fluid is proportional to $1/D^2(X)$. As the velocity varies with X, the amount of kinetic energy carried by the moving fluid varies. This contributes to changing the pressure. Also, frictional drag acting to retard the flow of the liquid in the equiduct can contribute to a change in the pressure. The result is that the pressure P(X) can vary with position. However, by choosing the increase in diameter so as to make V(X) have a suitable relationship with position, X, along the axis, and thus reduce the kinetic energy carried by the moving fluid by the correct amount, one could increase the pressure energy at the same rate at which frictional forces would cause a drop in the pressure. In that way, one might obtain an essentially constant pressure, independent of axial position, X, within a region of an equiduct 324 whose diameter increased with position as the fluid progressed through it. Under such circumstances, the pressure P322 near the outlet of such a section could be made to be substantially the same as the pressure P321 near its inlet. For that to be the case, diameter 318 would be larger than diameter 317. For the preceding discussion, it is assumed that the liquid is flowing in essentially fluid equilibrium, with the walls of the equiduct being surrounded by a liquid of essentially the same density as that filling the equiduct. The pressure being held constant is then the differential pressure across the wall of the equiduct. Using a fluid within an equiduct surrounded by a fluid of essentially the same density allows variation of pressure with depth to be neglected. This is because the variation of pressure with depth occurs similarly both within and without the equiduct under such circumstances.

Because of the difficultly, technically, of making an extended transition region having a slowly changing diameter, relatively shorter sections might be used in an equiduct system having staged diameters increasing from one equiduct to the next, so as to increase the pressure and provide driving pressure to overcome frictional forces. Such a series of transition sections might be used relatively near the end of an extensive equiduct transport system used for the transport of fluid. One reason for using such a sequence of progressive increases in diameter could be that, for example, in a flow augmented system, energy which had been used to build up the velocity of the moving liquid, and thus reduce the diameter of duct required for a long stretch of pumping of the fluid, might be reclaimed, to reduce the pumping energy which was not used in overcoming frictional forces with an equiduct. Excess remaining energy at the outlet is assumed wasted. If, for example, the equiduct system were to deliver liquid at low pressure and low velocity to some region, the velocity of the delivered liquid could represent a waste of kinetic energy. The more such kinetic energy is reclaimed by converting it into pressure energy and using it in the transport process, the less the total pump power required for the same amount of transport of liquid. This could be an economic tradeoff. Using staged diameters could require using larger diameters in downstream sections of equiducts, which may have associated therewith different construction costs. Transition sections also would have associated construction costs. Possibly an overriding consideration, in the event that such transition sections and such larger diameters were used in a small number of places, could be that the tooling costs may dominate other costs, and may be large enough to make such economy in operating power uneconomic by entailing a substantially larger outlay for tooling.

U. Cascading Flow Augmentation Means

Figure 22:
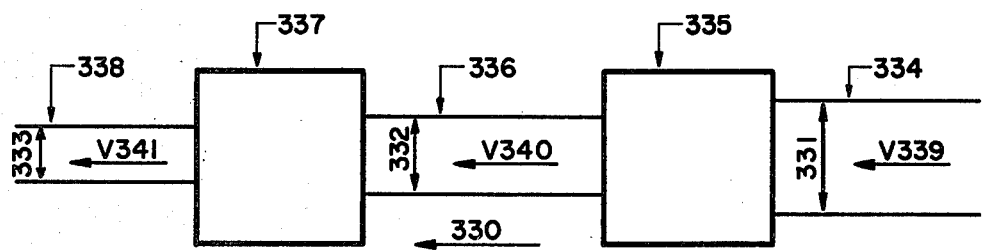
FIG. 22 is a schematic view of a cascade of flow augmentation means.

In FIG. 22 is depicted a cascade of flow augmentation means 335 and 337, used to augment the flow of liquid in the direction of arrow 330. Were the velocity of the flowing liquid to be increased appreciably, and were the volume flow to vary with load over a substantial range, it might be feasible to obtain a higher efficiency in the pumping process by using several impeller means, which operate independently of each other at speeds appropriate to the fluid they were pumping. Equiduct 334 with diameter 331 carries fluid into the system with velocity V339. The fluid passes through flow augmentation means 335 and enters equiduct 336 whose diameter 332 is smaller than diameter 331, and within which fluid moves with a higher velocity V340. Subsequently, the fluid enters flow augmentation means 337 whose output is through equiduct 338 with yet smaller diameter 333, and in which the fluid flows with yet higher velocity V341. Because of turbulence and drag characteristics, and other dynamic characteristics of flow augmentation means such as impellers, use of independently operating flow augmentation means in cascade may offer substantial improvement in efficiency. Where operation power is a substantial cost, it may be, under certain circumstances, economically desirable to save power by increasing the complexity of the flow augmentation means as a whole, by dividing it into cascaded sections which operate relatively independently of each other. Each such flow augmentation means might then operate relatively more efficiently.

V. Housings for Axial Flow Augmentation Means

Figure 10:
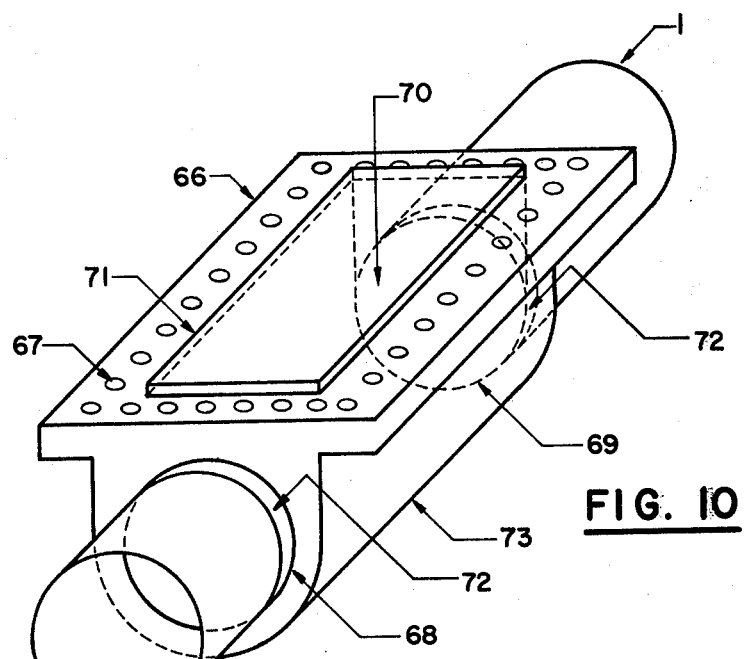
FIG. 10 is a partially schematic, partially elevation view of a housing for flow augmentation means connected to an equiduct.

In FIG. 10 is depicted a housing suitable for containing a flow augmentation means within an equiduct system. Equiduct 1 enters and leaves the station at ports 68 and 69. Suitable reinforcing 72 could be provided, to reduce the concentration of stress in equiduct 1 associated with flexing in contact with the relatively rigid housing of the pump station. The pump station consists of a housing generally designated 73, a flange 66 containing fastenings 67, and internal cavity 70 designed to just enclose a suitable pumping means. A lid 71 could be placed upon this housing, either with a pumping means contained therein or without a pumping means. In a flow augmented equiduct system, flow capacity for the entire system could depend upon the amount of flow augmentation used to force fluid through the duct system. For this reason, the system might be constructed with provision for more flow augmentation stations than were used during its early operation. The flow augmentation stations could be installed during the construction of the equiduct system. Additional flow capacity might then be added to this system merely by inserting suitable flow augmentation means into stations already present and connected to the equiduct. Similarly, reduced use might free valuable flow augmentation means for use elsewhere.

W. Removal of Flow Augmentation Means for Maintenance

With suitable design, with an adequately small spacing between successive flow augmentation stations, it would be feasible to remove from the equiduct system may single flow augmentation means without seriously degrading the performance of the overall system, and without interrupting its operation.

X. Removing Flow Augmentation Means Without Polluting Ambient

Figure 11:
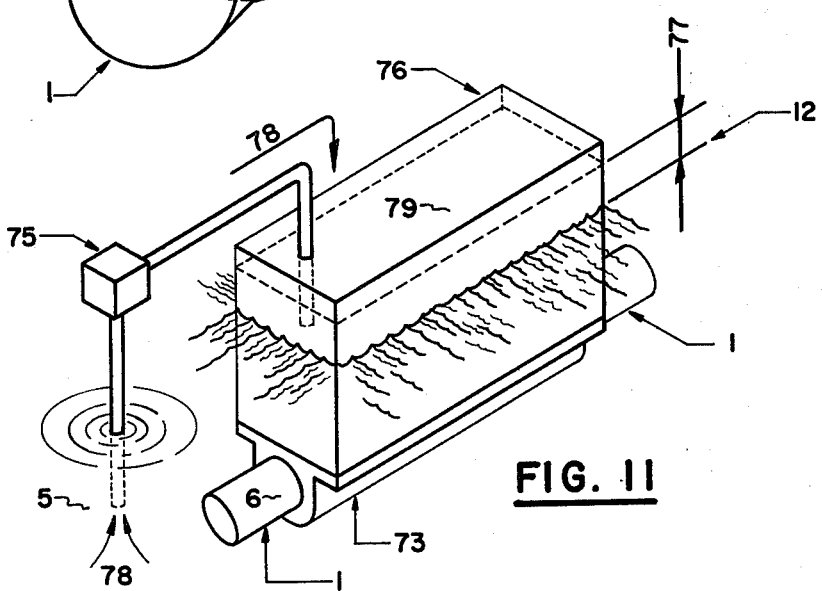
FIG. 11 is a partially schematic, partially elevation view of a rectangular well, which clamped onto the flow augmentation housing of FIG. 10 contains liquids while the flow augmentation means is being inserted.

If the contents of the equiduct were such that it would be undesirable to have them mingle with the surrounding fluid medium, suitable fixtures could be used which attach to the flow augmentation housing and contain fluids while the flow augmentation means is being inserted or removed. For example, a simple rectangular well which clamped onto the flow augmentation housing could serve this purpose. Such a well, as depicted in FIG. 11, could be flushed by the addition of surrounding fluid by a pumping means 75, which pumps ambient fluid 5, up into well 76, building up a higher liquid level in well 76 than that which is present at surface 12 of surrounding liquid 5. This additional height of liquid, designated 77, corresponds to the pumping pressure head $\Delta P$ available within equiduct system 1. Such a configuration, for example, might be used were fluid 6 sewage and fluid 5 unpolluted water from a naturally occuring body of water. Continuous pumping by pump means 75 in the direction of arrow 78 would allow the liquid 79 within well 76 to be continually flushed, both for the safety of people working in replacing a flow means and to allow the flow means to be inserted in such a way that the liquid remaining in well 76 would be essentially of the same composition as liquid 5, so that subsequent removal of well 76 from flow augmentation station housing 73 would not necessarily release undesirable material into the body of liquid 5.

Figure 12:
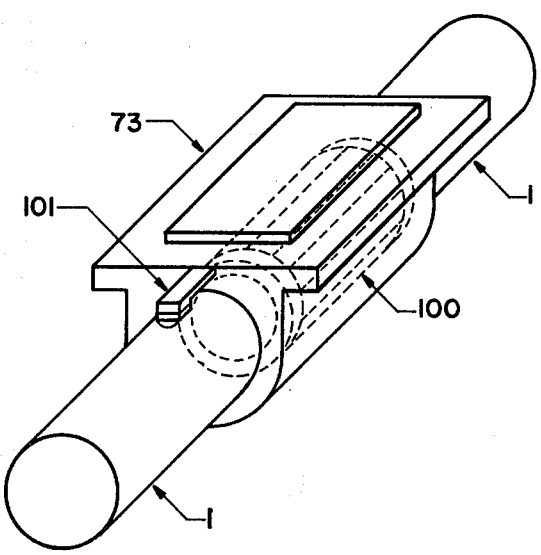
FIG. 12 is a schematic view of a safely instrumented system.
Figure 13:
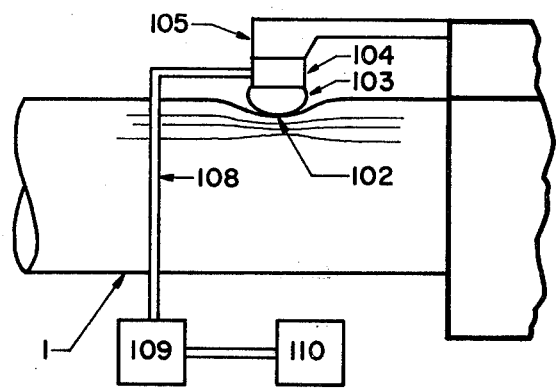
FIG. 13 is a detached schematic view of equiduct instrumentation including a strain guage.

Y. An Example of $\Delta P$ Measurement for Control: A Safe Flow Augmentation Station In FIG. 13 is depicted a pressure measurement system for measuring $\Delta P$ across membrane 1. A mechanical support 106, which could, for example, be flange 66 of housing 73 as shown in FIG. 10, supports a suitable attachment 105, supporting a force strain transducer 104, connected by an appropriate force distribution member 103 to depress a region of membrane 1, which depressed region is designated 102 in FIG. 13. This depressed region is acted upon by the internal pressure within membrane 1, that is, the internal pressure within the equiduct, minus the external pressure within the surrounding medium (not shown). This difference in pressure tends to restore the surface of equiduct 1 to an outwardly curved surface, and in so doing exerts a force on the transducer 104, which is directly related to the pressure difference between the inside and the outside of the equiduct. This output from transducer 104 then proceeds, as diagrammed schematically, through leads 108 to a suitable electronic system 109, in which it is converted to a suitable signal for controlling the operation of the mechanism 110 which actuates the flow augmentation means. In FIG. 12, this is depicted by a single reference number 101 in conjunction with a flow augmentation housing 73 and flow augmentation means 100. This combination, with the suitable controling feedback so as not to produce an excessive internal pressure, and with the use of a flow augmentation means which did not introduce excessive impedance to the flow of fluid therethrough in the event of its failure, or suitable valving to allow bypass flow, comprises a safe flow augmentation station.

Z. A Flow Augmented Equiduct System

Figure 14:
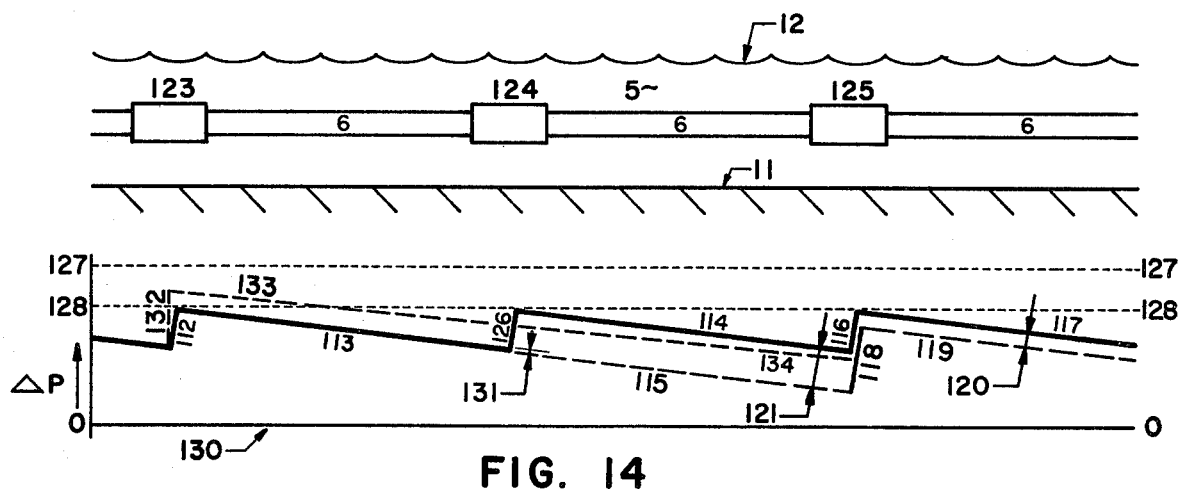
FIG. 14 is a schematic view of a safely augmented equiduct including a graph of the pressure differential between the inside and the outside of the equiduct.

In FIG. 14 is depicted a properly controlled flow augmented equiduct system. In FIG. 14, equiduct 1 contains liquid 6, which is presumed to have essentially the same density as ambient liquid 5 with upper surface 12 and bottom 11. Graph 130 depicts diagrammatically the difference between internal and external pressure for a liquid flowing within the equiduct under two different conditions. The solid lines 112, 113, 126, 114, 116 and 117 depict operation of the system in which each of the flow augmentation stations 123, 124 and 125 is functioning correctly. Each of them is used to restore the pressure difference, $\Delta P$, to a value 128 and each is suitably controlled so that each pumping station does not cause $\Delta P$ to exceed this. The amount of restoration, for example, 126, may be different for different flow rates which would result in a different amount of loss of $\Delta P$ associated with 113, 114 or 117. The operating pressure to which each flow augmentation means restores the value of $\Delta P$ remains essentially the same as designated by dotted line 128.

AA. System Operation with a Failed Flow Augmentation Station

Where flow augmentation means 124 is not operating to assist the flow, it could introduce a small decrease in $\Delta P$ associated with its impedence to the flow of fluid 6 through it. This is represented in graph 130 by gap 131. Liquid flowing between stations 124 and 125 again experiences a decrease in $\Delta P$ associated with frictional losses. For this case, the relationship between position and $\Delta P$ is designated by dotted line 115. Failure of pump means 124 results in a difference 121 in $\Delta P$. Thus, at the intake to flow augmentation means 125 the pressure $\Delta P$ would be lower than would otherwise be the case. The input sensor for flow augmentation means 125 senses this, and causes flow augmentation means 125 to produce a larger increment in $\Delta P$, here shown by line segment 118, than that produced during normal operation, shown by line segment 116. This ΔP may not be sufficient to restore the pressure to the value it would have had, had pump means 124 been operated correctly. As fluid progresses through the system beyond 125, its pressure drops during its flow to the next flow augmentation means, as depicted by dotted line 119. This ΔP is here depicted as being less than ΔP for normal operation depicted by solid line 117. The difference 120 is smaller than the difference 121 occurring in the section of conduit between flow augmentation means 124 and flow augmentation means 125. Subsequent flow augmentation stations, not shown, could respond to the remaining departure of ΔP below the desired operating point, and complete the processes of compensation for this, bringing ΔP up to 128 at the outlet of a subsequent flow augmentation station. It is the driving pressure available before the failed flow augmentation means that drives the fluid to the next operating flow augmentation station. However, it is the subsequent flow augmentation stations, which in response to the output of their sensors indicating inadequate pressure, pump harder than would otherwise be the case, in order to restore the pressure to the desired operating levels. Such a mode of operation does not require communication of signals among the various pumping stations, other than those signals which are a consequence of the pumped fluid itself.

BB. Communication Among Flow Augmentation Stations

Another type of operation is one in which there is communication among the various flow augmentation stations, so that the preceding flow augmentation station or stations could augment the pressure to a somewhat higher level than would be the normal operating value, so that the drop associated with the failure of a station, for example, 124, would not be as severe as might otherwise be the case. This is designated by dotted lines 132, 133 and 134. These designate an increase in pressure associated with an increased pumping action in flow augmentation means 123. In this case, augmented flow pressure is adequate to allow normal operating pressure 128 to be restored at pump station 125. Suitable electronic communication processes, and devices which could allow use of preceding pump stations in this way, are commercially available. Overall operation of the system might be integrated, e.g., by means of suitable electronic controls using a small and simple process control computer. Dotted line 127 designates the maximum design operating pressure for the system. The pressure augmentation 132 is restricted so as to be smaller than maximum design level 127. Using a preboosting process of the type represented by 132 and 133, etc., failure of more than one pumping station in close proximity might be accommodated in an emergency.

CC. Spacing of Flow Augmentation Means in an Equiduct System: A Safely Augmented Equiduct Relationships among costs of construction for duct with various structural strengths and cost of construction of pumping stations, and for the instrumentation to allow operation in various system modes as described in conjunction with FIG. 14 and Graph 130, might affect decisions as to how to implement an equiduct system of this general class. However, the use of a safe-flow augmentation means, and of monitoring with feedback to prevent excessive ΔP between inside and outside of the equiduct, gives rise to a general class of system, i.e. a "safely augmented equiduct." Such a safely augmented equiduct system allows advantage to be taken of the decreased structural requirements associated with using fluid equilibrium, by avoiding such large increases in pressure associated with flow augmentation as to make effectively valueless the decreased structural requirements associated with fluid equilibrium. The use of such fail-safe flow augmentation means thus appears to be a highly desirable feature in the construction of any extensive equiduct system. This would be true whether the system utilized ballasted equiducts or unballasted equiducts, equiducts with internal flutes to assist in the suspension of particulate matter or other debris, flow augmentation means designed to reduce interference from suspended paticulate or fibrous material, or other types of equilibrium duct or flow augmentation means. It is a direct consequence of the nature of equiduct systems that there is this relationship between the use of flow augmentation means and the reliable, safe operation of an overall equiduct system. Use of a flow augmentation station spacing in the equiduct system which allows fail-safe operation in the event of failure of a single flow augmentation means facilitates forms of maintenance which might otherwise require interruption of the operation of the system. For this reason, in a safely augmented equiduct it could be beneficial to make provision, as depicted in FIGS. 10 and 11, for maintenance without interruption of operation, to take advantage of this capability.

DD. Direction and Magnitude of Swirl: Conversion of Swirl to Driving Pressure

In a safely augmented equiduct system in which matter was suspended using an internal helical fluting system within the equiduct, the relationship between the rotation of impeller means in the case of a safe flow augmentation means of the types depicted in FIGS. 7, 8, and 9 and the duct fluting might advantageously by such that the swirl introduced into the fluid by reaction against the impeller blades were in the same direction as the swirl associated with the flow within the fluted equiduct. In this way, additional swirl introduced by the impeller blades could serve two functions: to assist in maintaining in suspension particulate or other matter; and to be partially converted by the fluting into additional driving force to augment the motion of the liquid along the axis of the equiduct. The conversion of this swirl into driving pressures would occur at regions downstream from the flow augmentation means, and therefore contribute a driving pressure which would not necessarily appear as an increased peak pressure of the liquid within the equiduct near the flow augmentation means. In this way, some additional flow augmentation might be achieved, without requiring as much structural strength to withstand internal ΔP as might otherwise be the case.

EE. Gate Valve Means with Equiduct

Figure 23:
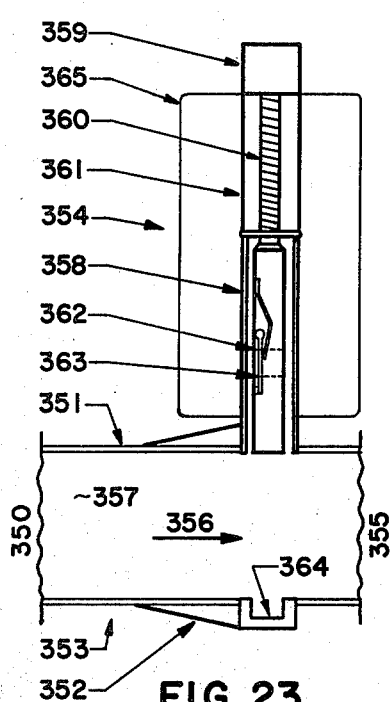
FIG. 23 is an elevation view of a flow control valve for an equiduct.

In FIG. 23 is depicted diagrammatically a flow control valve means 254 connected to an equiduct 353. Broken lines 350 and 355 indicate that this is a portion of a system, the rest of which is not shown. Equiduct 353 carries fluid 357 in the direction of arrow 356. Its wall 351 is reinforced by suitable flex supporting member 352, in conjunction with housing 358 of flow control means 354. This flow control means incorporates a suitable positioning mechanism such as a motor 359, in conjunction with a linear actuator 360, for example, a screw. These together comprise actuating mechanism 361, which moves gate 362 in and out of stream of fluid 357. This gate incorporates a suitable overpressure relief mechanism, such as a preloaded flap 363. This is to prevent water hammer effects associated with the momentum of fluid moving within the equiduct. When the gate is in the closed position it seats into a seat 364. The closing of the gate should be done relatively slowly so as to avoid building up large pressures in equiduct 353 associated with the decreasing momentum of the moving fluid flowing therein. A suitable floatation means 365, if desired, may be attached to the housing in order to provide the desired buoyancy.

FF. Equal Input Velocity Flow Merging Means

Figure 24:
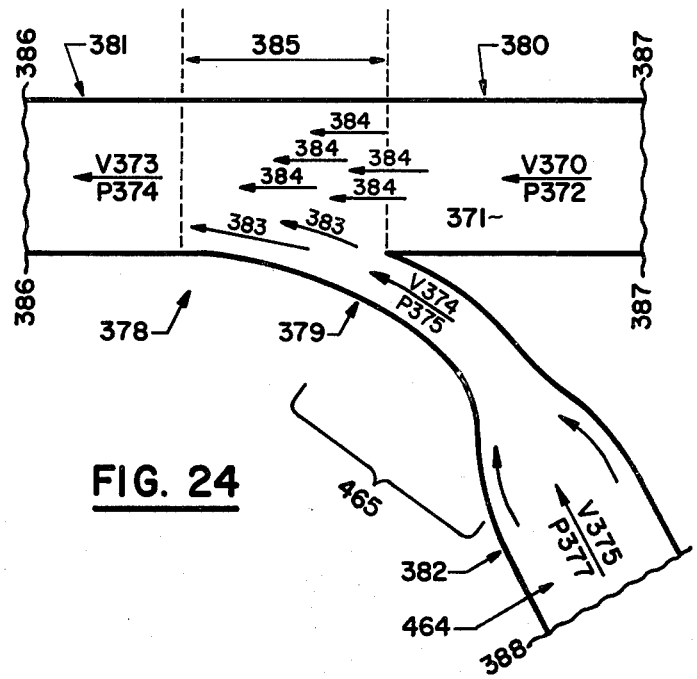
FIG. 24 is an elevation view of a junction whereby fluid flowing within one equiduct can be combined with fluid flowing within another equiduct.

In FIG. 24 is depicted a junction by which fluid flowing within one equiduct, or other suitable fluid transport means, can be combined with fluid flowing within another equiduct. This junction is designed in such a way as to allow the fluids to mix without having substantial changes in the direction or speed of the fluids as they mix, which changes might give rise to frictional losses due to swirling. Some change would occur as a consequence of the flow of an additional volume of liquid within the equiduct subsequent to the joining of an additional flow thereto. In FIG. 24, equiduct 380 carries fluid 371 in the direction indicated for the velocity V370, with a pressure P372. This is delivered from some other portion of the system located to the right of broken line 387. Equiduct 382 carried fluid in the direction indicated by V376, with pressure P377, delivered from some other portion of the system on the other side of broken line 388. Because the amount of frictional losses in an equiduct per unit flow decreases with increasing diameter, it can be advantageous to utilize relatively lower velocities for flow of fluid within smaller equiducts than within larger equiducts, so as to have a more nearly equal utilization of power per unit flow per unit distance. For this reason, the flow velocity in equiduct 382 is presumed to be smaller than the flow velocity in equiduct 380. Before the fluid 464 in equiduct 382 is allowed to enter and mix with the fluid carried by equiduct 380, some of its pressure energy is converted to velocity energy in constriction region 465. In 465, a smooth decrease in the diameter of equiduct 382 is used to increase the velocity to a new value, V374, approximately equal to V370 of fluid 371 in equiduct 380. When this is done the pressure P377 initially present in equiduct 382 decreases to a new value, P375. For mixing to occur properly P375 should be very nearly the same as P372 of liquid 371. In region 385 mixing occurs. Arrows 384 represent the stream lines for fluid 371 entering from equiduct 380. Arrows 383 represent the stream lines for fluid 464 entering from equiduct 382 through its constriction region 465. A smooth transition 379 in the shape of the constriction region 465 completes the formation of the junction between equiducts 380 and 382. If equiduct 381 has essentially the same diameter as equiduct 380, then the fluid velocity V373 of the fluid moving therein must be greater than velocity V370 for fluid in equiduct 380. Thus, some of the pressure energy of fluid 371 would be converted to velocity energy. Thus, the pressure P374 would be reduced below the level P372 which liquid 371 had upon entering the union. In selecting the operating pressures and velocities for liquid in equiducts 380 and 382, due consideration might properly be given to the effects of increase in velocity and decrease in pressure associated with the merging of the streams of fluid. This may be especially significant in choosing operating points to protect against the effects of disturbances in the surface of the equiduct, such as surface waves. Such surface waves and disturbances are discussed in more detail in my copending patent application *2.

To avoid the high velocity flow losses in a small diameter equiduct, the diameter of equiduct 382 is reduced as part of the merge. It is not necessary to do this. One could, for example, utilize a relatively small diameter equiduct, such as the diameter which equiduct 382 has after passing through throat region 465. In that case, the velocity of the fluid could be appropriate without further constriction. Choice of diameter of equiduct for such use could depend upon economic considerations. Such economic considerations may include the amount of pump energy used in transporting the fluid through various diameters of equiduct, the cost of constructing the transition sections, the cost of various sizes of equiduct, and the configuration, including such configurational variables as distance to source of pressure energy, flow augmentation means, or availability of gravitational head, discussed elsewhere herein in connection with FIG. 27. Fluid is then delivered through equiduct 381 to some other portions of the system to the left of broken line 386.

GG. Variable Flow Ratio Merging

Were the merge in FIG. 24 operated with flows in equiducts 382 and 380 in the ratio for which the merge was designed, then the mixing would occur with substantially equal velocities of the two entering streams at the mixing region. However, were the two flows not in this ratio to each other, mixing could occur between streams of fluid moving with different velocities. Thus, the velocity V374 and the velocity V370, respectively, of the two entering liquids might be substantially different from each other. Under such circumstances, the mixing process might be relatively less efficient, in that mixing of these two fluids could result in conversion of flow energy to heat by the mechanism of turbulence.

Two extreme situations may be characterized relatively easily. In one case, the velocity V374 of the merging stream might be substantially greater than velocity V370 of the main stream. The properties of this merging may be characterized by the conservation of momentum of the two streams before and after they have merged. Although energy may be converted to heat during this mixing process, the momentum may be substantially conserved, with only relatively minor losses through friction to the walls. The smaller stream of relatively high velocity fluid from the entry port would move into the mixing region, entraining in its motion fluid 371 from equiduct 380, and carrying it along towards downstream region 381. As the entering stream of fluid increased in diameter by turbulence and entrainment to fill the downstream equiduct, its velocity would decrease. During the course of this process, its momentum would become converted partly to pressure. Thus, the pressure P374 downstream from the mixing region might be greater than the pressure P372, in the case where velocity V374 is substantially greater than velocity V370. Thus, in this extreme of operation, a merge can serve in a way analogous to a jet pump. If such operation as a jet pump were intended in the design, then a concentric geometry might be advantageously be used, in which the relatively smaller stream of relatively higher velocity liquid were introduced concentrically at the center of an annular duct carrying the relatively lower velocity liquid. In this manner, a gravity head available in a branch feeding into an equiduct system might be used to augment flow of fluid within the main equiduct system fed thereby in the course of merging the stream of fluid therewith. The source of energy in such a process would be substantially the energy brought into the merging streams of fluid associated with velocity V376 and pressure P377 of fluid 464 entering through equiduct 382. This might be provided by gravitational head, or by suitable flow augmentation means, or some combination thereof. Note that in this case energy is lost due to turbulent mixing. Thus, this mode of operation would have lower efficiency than that in which the streams of fluid merged with substantially the same velocity. However, choice of operation in this mode might allow energy to be provided substantially from one of the merging branches of fluid, rather than from both.

The second extreme case is that in which the velocity of the entering branch is substantially lower than the velocity of the main stream of fluid. That is, velocity V374 could be substantially lower than velocity V370. Again, during the mixing of the two streams with different velocities, energy of flow or pressure could be converted to heat by turbulence. In this case, the energy present downstream from the merge, characterized by velocity V373 and pressure P374, would depend substantially upon the inlet velocity and pressure V370 and P372, respectively, of fluid 371 in the main stream. Entrainment of relatively more slowly moving fluid entering with velocity V374, would result in an increase in the velocity so that V373 would be greater than V370. The pressure P374 would be less than the pressure P372, corresponding to the loss of pressure energy associated with several physical effects: one component of this loss of pressure energy would be the increase in kinetic energy of the fluid necessary to allow the increased volume of fluid to proceed through substantially the same diameter equiduct on leaving the merge; another component of this drop in pressure energy would be the conversion of some flow energy to heat through turbulent mixing of the two streams of fluid. In this case, relatively little energy need be brought to the merge with the fluid transported in branch equiduct 382. That is, the velocity V376 and pressure P377 could be substantially less than in the case discussed above for the other extreme of operation. This might be advantageous in reducing the pumping requirements on flow augmentation means implementing the flow into the merge from the branch. Thus, if numerous branches were merged into an equiduct system, it might be economically advantageous to provide substantially all of the pumping power required in such merges by suitable flow augmentation means stationed along the main equiduct into which these branches merged.

For substantially smaller departures of the ratio of flows entering the merge from that for which the flows would merge with substantially the same velocity, the effects discussed above would occur to a smaller extent. Thus, for any such departure from mixing with substantially equal velocities, one could expect turbulence to convert flow energy to heat to a greater or lesser extent. However, departures from the designed merge velocity could be satisfactorily accepted in the operation of such a merge. Plug flow would be more likely to occur in the equiducts and merges than would laminar flow, because of the relationship between density, viscosity, velocity of flow, volume of flow and system geometries.

Proper estimation of mixing ratio in a merge designed to provide substantially equal velocity mixing of streams of fluid could be economically advantageous in reducing the overall requirements for flow augmentation, thereby allowing reduction in capital equipment used for flow augmentation, or in pumping energy required.

HH. Variable Geometry Merges

Variable geometry merges might be useful, especially where large flows were to be accommodated with minimal loss of energy on merge. Such variable geometry merges could accommodate the varying cross sections required to allow the two fluid streams to mix with substantially the same velocity at their mixing region. However, because the complexity of such variable geometry merging systems would likely lead to substantially greater fabrication costs than would be associated with fixed geometry merges, they appear less likely to be used in many applications. Variable throat geometries have been used in the construction of supersonic wind tunnels. Similar technologies, using hydraulically or otherwise actuated displacements of a flexible wall, might be used in achieving an adjustable throat and wall geometry in a merge for use, for example, with equiduct systems, described herein and elsewhere in my copending patent applications *2, *3, *4 and *5. Instrumentation for monitoring such a merge system, and controlling its performance, would be essentially similar to that for generally maintaining and controlling the performance of equiducts under various operating conditions, e.g. as set forth in my copending application *3.

II. Use of Other Merges

Although the various merges described herein are configured to converse flow energy, other types of merges could be used if desired. For example, a simple T-joint, or a T-joint with suitable gas backflow restraints, such as traps, could be used. Such apparatus is known in the art, and many such types of apparatus could be modified for use with equiducts without departing from the scope of the invention as set forth herein.

JJ. SPDT Slide Valve for Equiducts

Figure 25:
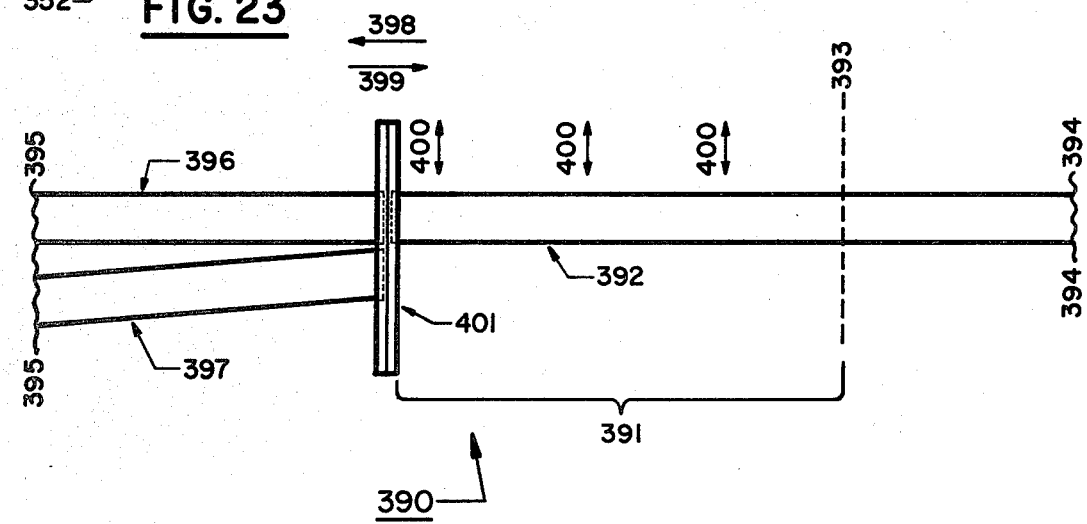
FIG. 25 is an elevation view of a valving mechanism for switching the flow of fluid in equiducts.

In FIG. 25 is depicted a valving mechanism for switching the flow of fluid in an equiduct, 392, through one or both of equiducts 396 and 397. These are depicted as portions of a system extending to either side of broken lines 395 and 394. Within region 391, equiduct 392 is presumed to have sufficient flexibility to allow side to side motions designated by double headed arrows 400. 401 denotes a suitable slide plate assembly which covers the unused openings on equiducts 396 and 397 and allows equiduct 392 to be moved from side to side so as to position it in direct opposition to either equiduct 396 or 397, or any intermediate position therebetween. Thus equiduct 392 would be able to feed fluid to equiducts 396 or 397, or to divide fluid between them. This corresponds to flow of fluid in the direction of arrow 398. For fluid flow in the direction of arrow 399, equiduct 392 could receive fluid from equiducts 396 or 397, with valve mechanism 401 serving to block off either equiduct or the other, or to allow both equiducts to feed fluid into equiduct 392 simultaneously. This entire valving mechanism is designated generically 390.

Utilization of a slide type valve which does not fully close the equiduct delivering fluid into the valve mechanism has the advantage of reducing the development of water hammer effects in the incoming equiduct. For example, the valve can shunt in an "open before close" manner, connecting flow to one duct before or while closing it off to another. Such a valve might be operated somewhat more rapidly than a valve which closed the incoming equiduct in the course of making a transition between one outgoing equiduct and another. Capability of somewhat more rapid operation without introducing undesirable dynamic effects, such as water hammer effects, might be advantageous for shunting material from a damaged equiduct into an undamaged equiduct. More rapid operation could be desirable were a noxious material carried within a tandem equiduct system. A tandem equiduct system could provide the capability of shunting flow, and carrying it in such a way as to make use of one of the equiducts which might be damaged unnecessary. The ability to do this promptly might reduce the amount of noxious material introduced into the ambient medium. For example, an equiduct system for carrying sewage within a waterway might advantageously benefit from the capability of more rapidly shunting fluid from an equiduct which was damaged, either accidentally or intentionally, in such a way as to cause its contents to spill into the ambient medium. This makes flow in slide valve 390 more desirably directed from equiduct 392 to equiducts 396 and 397. Such flow could be switched without closing off duct 392, thus reducing pressure rise therein.

Figures 26, 27, 28:
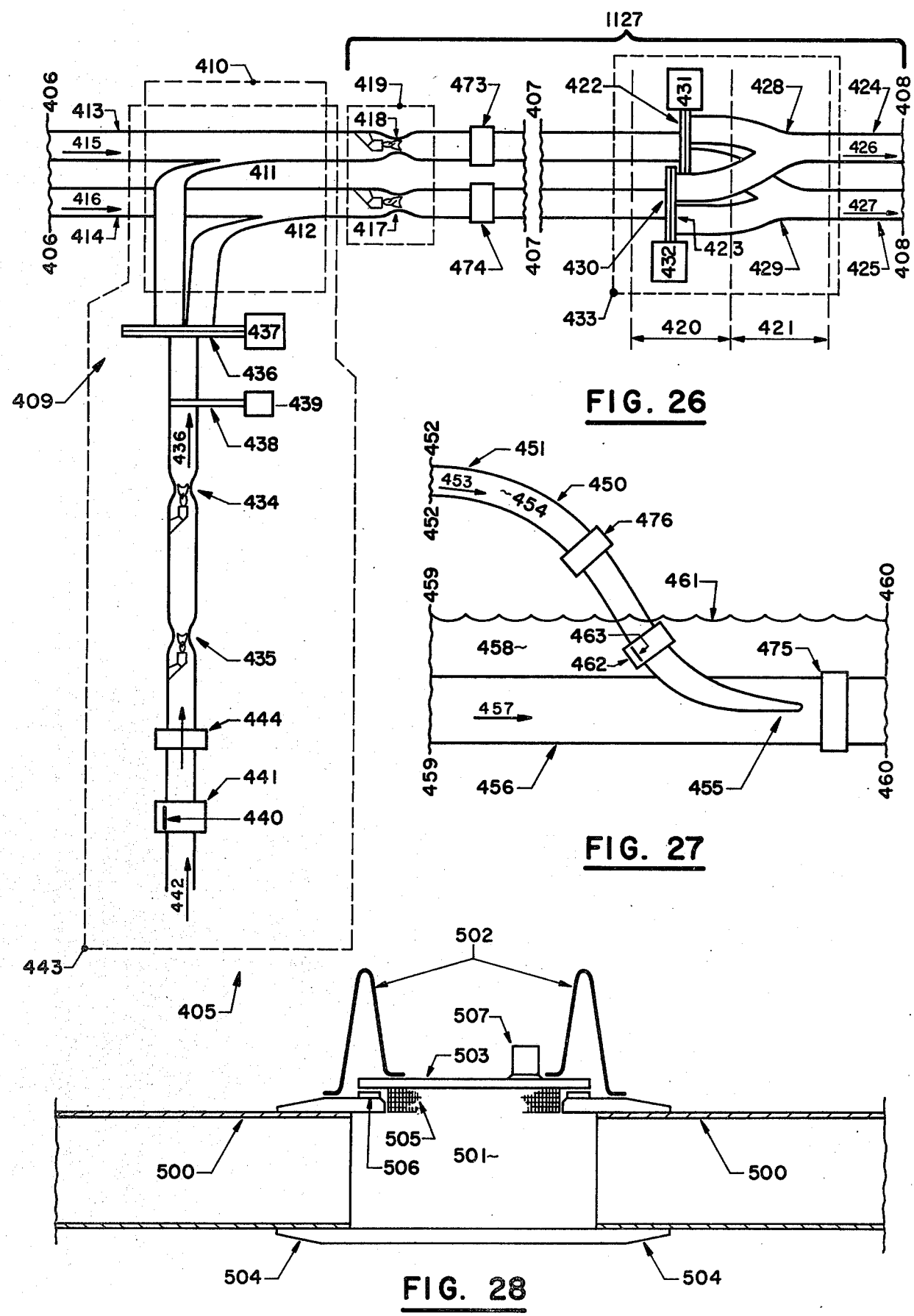
FIG. 26 is a view of an overall equiduct system wherein fluid may be introduced into tandem equiduct transport systems.
FIG. 27 is a schematic view of an alternative means by which fluid may be introduced into an equiduct.
FIG. 28 is an elevation view of a safety valve for an equiduct.

KK. An Example of a General Flow Introduction, Augmentation, and Control Station In FIG. 26 is depicted a system by which flow may be introduced into a tandem equiduct transport system with suitable provision for increasing the velocity and pressure of the flow entering, protecting against backflow, valving the flow into one, both, or the other of the equiducts in the main operating system, augmenting flow in the main operating equiducts, and switching flow among these equiducts to allow the flow to be carried entirely by one or the other or divided between both. This is a fairly general class of equiduct flow insertion and flow control station. It might find use, for example, in an extensive equiduct system with fail safe capability, with tandem equiducts operating to allow large peak loads to be carried, and for allowing individual portions of equiduct to be removed for maintenance without interrupting the operation of the system. Referring to FIG. 26, within dashed line 443 is the injection mechanism. This includes one way valve 441, including a suitable closure flap 440, to prevent accidental backflow of fluid 442, which enters the system in the direction of the arrow as shown. It passes through one way valve 441, passes instrumentation station 444, passes through flow augmentation means 435 and 434 which are utilized in cascade partly to provide accommodation for more efficient operation for a wide range of flow velocities and pressures, and partly to provide fail safe operation by allowing fluid to continue to enter the system effectively in the event of failure of either such flow augmentation means. Fluid then passes in the direction of arrow 436 through an optional gate valve 438, with suitable actuating means 439. This gate valve could be used, for example, to close off access to the main system in the event of some mishap. Fluid then passes through slide valve 436, which is controlled by suitable actuating means 437. Thence fluid passes through junctions 411 and/or 412 to enter equiducts 413 and/or 414. Valve 436 is shown set so that fluid enters both equiducts 413 and 414. Within the two main operating equiducts 413 and 414 liquid passes in the directions 415 and 416, from some other portion of the system located to the left of broken line 406. Flow augmentation station 419 contains suitable flow augmentation means 417 and 418 which are presumed part of a suitable safe flow augmentation system such as is discussed elsewhere herein. Broken lines 407 indicate a possible gap between flow augmentation station 419 and valve station 420. Valve station 420 comprises two slide valves, separately operable, by which fluid from equiducts 413 and 414 may be switched to flow through equiducts 424 and 425 in any combination desired. Either of the incoming equiducts may feed either or both of the outgoing equiducts. In this way, flow could be shunted so as not to pass through one of the outgoing equiducts, to allow it to be drained of its fluids for maintenance and repair. At switching station 420, slide valve 422 receives input from equiduct 413 and is controlled by suitable control means 431. Slide valve 423 receives fluid from equiduct 414 and is controlled by suitable control means 432. The position of equiduct 414 is designated 430 and is depicted as positioned to feed fluid to both output equiducts 424 and 425. In region 421 of the switching station are two merges, 428 and 429, by which fluid is allowed to flow in directions 426 and 427 through equiducts 424 and 425, respectively, progressing to other portions of the system to the right of broken line 408. Suitable floatation means may be included. These are designated by dotted lines 433. Similarly, flow augmentation means station 419 can include suitable floatation means. Similarly, junction means in station 410 can include suitable floatation means. By these and other floatation means, the buoyancy of various portions of the system may be controlled. This control of buoyancy could be desirable in allowing placement of the equiduct system either on the surface, on the bottom, or part way between the surface and the bottom of a body of fluid within which such a system might be located. This is discussed in more detail in my copending patent application *2. This overall system for introducing new material into, merging with, augmenting flow in, and controlling an equiduct is generally designated 405.

LL. Flow Augmentation and Control Station

In FIG. 26, portion 1127 of apparatus 405 represents flow augmentation instrumentation, and valving means comprising a satisfactory flow augmentation and valving station suitable for use with a tandem safely flow augmented equiduct system. With such a tandem system, flow could be directed to one or another of the downstream equiducts from the upstream equiducts, allowing distribution of flow for reduced pumping power consumption or, in the event of failure of a downstream equiduct portion, allowing that equiduct to be removed from service for maintenance without requiring that flow be interrupted in the system. If desired, flow could be switched relatively rapidly between one downstream equiduct and the other downstream equiduct so as to provide a surge of pressure in that downstream equiduct to which the flow was being diverted. This might be desirable if blockage had occurred within a portion of equiduct and if such blockage might be cleared from that equiduct without incurring a pressure rise beyond that which could be tolerated by the equiduct wall. More typically, such rises in pressure would be avoided by slowly shifting flow of fluids from one equiduct to another. Also, by passing substantially all of the flow through one of the equiducts at a time, the velocity of flow of fluid therethrough could be increased. This could be desirable in resuspending material which had sedimented within the equiduct. Such sedimentation resuspension is discussed in more detail in my copending application *4.

MM. Momentum Change During Valving

Were fluid flowing within an equiduct towards a valve system, and the fluid could be directed by that valve system into two or more downstream equiducts which were substantially filled with fluid, switching the incoming fluid among the outgoing equiducts could lead to velocity changes in the flow of the fluid within those equiducts. Thus, such switching should be performed at a rate commensurate with the rate at which the velocity of the fluid in the downstream equiducts could be changed safely. Although the velocity of flow of the fluid in the incoming equiduct might be substantially the same during all portions of the switching, velocity in the equiduct to which the flow was being directed might be substantially increased. Associated with this increase is an increase in momentum and in kinetic energy. Pressure must be used in bringing this liquid up to speed in a substantially horizontal duct. Were the switching performed too quickly, the incoming column of liquid in the incoming equiduct would be brought abruptly against the relatively slower moving column of liquid in the outgoing equiduct. This could result in substantial and rapid increases in pressure within both equiducts. This could be hazardous in the operation of a system in which fluid flows at relatively high velocities. Operation of the system should take into account these pressure changing effects. Thus, those portions of the system operation algorithms which control flow within the system should also include the effects of pressure change and rate of change of flow, as to avoid undesirably great increases of pressure within the equiducts. The duct carrying fluid away from the valving system in which the velocity of flow was being decreased, could suffer a reduction in internal pressure sufficient, under some circumstances, to cause the equiduct to become slack. Because of the effects of surface wave instabilities, discussed in more detail in my copending application *2, it may be relatively undesirable to have a slack condition in the wall of the equiduct. However, in the event that the equiduct were being removed from service, the momentum of the fluid contained within the equiduct might advantageously be used to empty the equiduct substantially, allowing the wall of the equiduct to collapse behind the fluid as it moved downstream under the influence of its momentum.

NN. Gravity Feeds

In FIG. 27 is diagrammed another way in which fluid may be introduced into an equiduct. This is a portion of a larger system extending to the left and right of broken lines 459 and 460, respectively. Fluid 454 from some system to the left of broken line 452 progresses in the direction of arrow 453 within equiduct 450. This fluid is fed by gravity from above surface 461 of ambient medium 458, within which is located equiduct 456. Equiduct 456 carries fluid in the direction of arrow 457. A suitable merge 455 is included. This might contain, for example, a constriction as was discussed previously in connection with FIG. 24, by which pressure energy in equiduct 450 would be converted to velocity energy to match velocities and pressure appropriately with the contents of equiduct 456. The velocity of fluid flowing in equiduct 456 would be affected by the addition of fluid from equiduct 450 in much the same way as was discussed in connection with FIG. 24. A suitable check valve means 462, with flap 463, is shown as being included in this system. Note that the gravity feed would be accomplished by introducing fluid from a height above the ambient medium surface 461. Were both the contained fluid and the ambient fluid to have essentially the same density, it would be this additional head above the surface 461 that constituted the driving head, rather than the total height of entry into equiduct 450 above merge 455. For many applications, a gravity feed could be suitable for feeding material into an equiduct system. Such a gravity feed could be used with suitable switching and control means, as discussed in more detail in connection with FIG. 26. The simplified version illustrated in this FIG. 27 is intended to illustrate the use of a gravity head. It should be understood that the various switching and augmentation and control means may be used in conjunction with this and other feeds, and each other, in suitable combinations. The entry of fluid into equiduct 456 is shown below the highest portions of equiduct 956. This could avoid gas which may be presented in 456, which might otherwise undesirably escape through feed 450 under conditions of reduced inflow. This gas might be removed elsewhere by a suitable gas segregation means, as discussed elsewhere herein.

OO. Stiff Equiduct Wall for Some Gravity Feeds

In gravity feeds, occasionally the equiduct might advantageously be constructed in such a way as to be relatively insensitive to the quantity of fluid transported within it or the pressure of that fluid. This could be desirable where substantial excess capacity were included within such a feed, and often the feed might therefore run relatively empty. Under such circumstances, wall stiffness might be incorporated in the duct wall, to help it to be stable against surface waves or other degrading effects associated with flow of fluid through it when it was in a partially collapsed state. This stiffness could be combined with suitable damping to further reduce the effects of such wave motion upon the duct wall. Such stiffness and damping considerations are discussed more generally with respect to equiducts in my copending application *2. Such gravity feeds might extend for considerable distances along relatively steep tributaries of a river, such as small creeks, in which the flow of liquid within a duct might, under many circumstances, be sufficiently augmented by the average slope of the equiduct as laid so as to occasionally cause the equiduct to run partially collapsed or partially empty. Under such circumstances, however, the diameter required for the duct could often be sufficiently small so that a substantially stiff duct could be used without excessive installation or fabrication cost. For example, extruded plastic ducts a few feet in diameter might be used under such circumstances, with sufficient wall stiffness so that collapse of the duct in the absence of substantial flow through the duct would be a relatively minor consideration. This could be true also if the ducts were located in a body of water in which it was not fully submerged, as could be the case, for example, where the ducts were located in rapidly flowing, fairly steep creeks.

PP. Instrumentation of Merge, Flow Augmentation, and Control Station

Suitable instrumentation stations may be included in the various systems discussed in connection with FIGS. 26 and 27. For example, instrumentation stations 473 and 474 might be utilized following flow augmentation means 418 and 417, partly, for example, for the actuation of control loops which are utilized in controlling the operation of such flow augmentation means. Similarly, other instrumentation may be placed elsewhere in the system as appropriate for control. In FIG. 27, an instrumentation means 475 has been depicted as incorporated in equiduct 456. Instrumentation station 476 in equiduct 450 might be used, for example, for gathering information relevant to billing, were billing dependent upon use. Also, it might be used for obtaining information as to flow rates and composition of material introduced into the equiduct. Various forms of instrumentation, and various ways in which they may be implemented, are discussed in more detail in my copending patent application *3. Use of these various instrumentation stations for obtaining information for operation and control of the equiduct system might be a desirable step in improving the performance of an extensive system. This is discussed in more detail in my copending patent applications *2, *3, *4 and *5.

QQ. Multiple Inlet Parallel Equiduct Feeding Merge Station

In some applications, it may be convenient to utilize a number of gravity feeds, feeding material into an equiduct which runs in parallel with the main equiduct system for a brief portion of its length. Then, the material in this parallel equiduct could be passed through a suitable flow augmentation means to bring it up to the pressure and velocity appropriate to that main equiduct system, and merged therewith. In this way a large number of inputs might be accommodated without requiring a large number of flow augmentation and control stations. Gas segregation (discussed elsewhere herein) also might advantageously be performed on such a combined flow. For example, in an application in which sewage from a municipality ordinarily were otherwise discharged in a river, gravity feed might be utilized in the collection of sewage from each of a multiplicity of outlets. This collected sewage would pass into the short, parallel, section of equiduct. After sewage from a substantial number of such outlets has been merged, the combined flow would pass through a single flow augmentation and control station, for example, of the type diagrammed in FIG. 26. In this way, the cost of accommodating existing facilities for discharging municipal sewage to an equiduct collection system might be substantially reduced, and the modifications of existing facilities minimized. Minimization of the costs and amounts of modification could have both economic and sociopolitical consequences in simplifying and making more practical using an equiduct system for cleaning up a waterway. Such applications of equiducts are discussed in more detail in my copending patent application *5.

Numerous other types of control mechanisms and valve mechanisms will occur to those familiar with the art of valves and controls.

RR. Flow Retardation with Energy Recovery

For reasons which are set forth in more detail in my copending patent application *2, it might under some circumstances be advantageous to maintain significant internal operating pressure within an equiduct. Under some circumstances, implementation of the maintenance of such an operating pressure might advantageously use the introduction of a back pressure at a region downstream from that at which a forward pressure were made available within the system. Were flow augmentation means used, the introduction of such a back pressure might represent an undesirable drain upon the power used for producing the flow. Power may be derived, however, from the flow of the fluid within the equiduct. This is one way in which a back pressure could be produced. For example, any of the various flow augmentation means diagrammed in connection with the various figures of this patent application and using a suitable axis flow impeller can be thought of also as means by which energy may be derived from flow of fluid. The same configurations which would allow debris shedding during operation of an impeller system for flow augmentation also could be advantageous in allowing the shedding of debris by a blade driven by the flow of the fluid. Such driven blades could represent the drag upon the flow of the fluid for producing a back pressure. At the same time, their rotation could be used for actuating a suitable conversion means, by which the mechanical energy extracted from the flow of the fluid within the system could be made available in some other form, such as electrical energy. Were a back pressure to be produced where gravity feed was available for the forward pressure, such a means of producing back pressure represents a mechanism by which useful work might be extracted from the flow of the fluid. Thus, the equiduct could be maintained at the desired operating pressure, and at the same time, the means by which back pressure within the equiduct were maintained be used for doing or reclaiming useful work. Such flow retardation means could be especially useful at the termination of an equiduct, where the back pressure available might otherwise have an undesirably fixed relationship to the flow through the equiduct. Where the drag on the flow through the equiduct is produced by a suitable power generating means the amount of load imposed upon the flow could be varied in a way which did not have to have a direct linear relationship to the flow through the equiduct. In this way, a greater degree of control might be exerted upon the pressure within the equiduct, to maintain a pressure selected to optimize the performance of the overall system. Some constraints upon the internal pressure arise from maximum strength constraints in the equiduct wall, as discussed elsewhere in this patent application; constraints on dynamic stability and strength, as discussed in my copending patent application *2, and economic constraints as discussed in this application and in my copending patent applications *2, *3, *4 and *5. An example of a location in which a power generating back pressure mechanism at the termination of an equiduct might be desirable is given in FIG. 5 of my copending application *4, and is denoted by numeral 128. Such a mechanism might be of the form illustrated in FIG. 15. In such a configuration, the throat increases the velocity of flow of the fluid within the equiduct system so as to render more effective the coupling between rotation of the impeller blade 211 and the flow of the fluid within the equiduct. This would then be utilized to actuate a generator 209, instead of utilizing a motor 209 to actuate the rotation of impeller 211. The relationships between flow of the fluid and electrical energy used in pumping the fluid are substantially similar to the relationship used in extracting energy from the flow of the fluid to produce electrical energy. Thus, FIG. 15 may be regarded as depicting either a flow augmentation means or a back pressure generation means. In FIG. 16 is depicted a set of spiral flutes which might be used in divergence region 203 following throat 204. Were power generation the objective, such spiral flutes might be included within constriction region 205 to introduce swirling, to render more effective the rotation of the blade by the flowing liquid.

SS. Externally Accessible Lubrication

Lubrication of flow augmentation means utilizing impellers and other rotating systems, or systems requiring the use of bearings or other lubricated components, should be accessible from outside the flow augmentation means for ease in preventive maintenance.

TT. Flushing to Clear Leading Edges and Seals

Provision might be made for cleaning and flushing various portions of the system from outside. For example, the leading edge of slanted supports intended to shed debris might be provided with small apertures through which fluid could be ejected under control of an external feed, to flush debris from such surfaces. Similarly, fittings used on makeup of joints and of seals could be provided with ducts to blow debris out of the way before the fitting was remade.

UU. Free-Spinning Impellers if Drive Fails

Impellers could utilize bearings inside the impeller itself, with one-way engagement of the motor shaft, in the event that it is desired to avoid the possibility of development of back pressure by seizure of the motor bearings. In other applications, it may be desirable to maintain a permanent linkage between the motor and the impeller, to be able to use the motor as a generator actuated by the impeller.

VV. Magnetic Assist to Extend Bearing Life

To improve the life of thrust bearings utilized in the impeller systems, a portion of the load could be supported by high coercive force magnetic bearings. Under normal loading, these could take up most of the thrust load. The life of a ball bearing typically varies as the inverse cube of its load. Thus, using suitable high coercivity magnetic supports, contributing to reducing the thrust load on the bearing might prove economic by substantially increasing their operating life and reducing maintenance requirements.

WW. Chemical Additives to Reduce Impedence to Flow

One class of process by which the flow through an equiduct could be augmented is the use of chemical additives which reduce the impedence to flow associated with the equiduct. For example, polyethylene monoxide can be utilized in small quantities to decrease the impedence of flow presented by a duct. This chemical is added to the material flowing through the duct. This might not be a necessary operating condition for the system, but under certain circumstances might be an economically advantageous one, by reducing the diameter of duct required for a given load, or by reducing the amount of pumping power required for a given load and duct diameter. Such additives might be advantageous, for example, in the event of large peak loads upon the system, such as might be associated with storms in metropolises in which storm sewage and biological sewage was combined.

XX. Inspection and Access Ports

Suitable cleaning ports and inspection ports could be included in flow augmentation means, flow control means, flow switching means, or other apparatus, to simplify inspection of the performance of the equipment examination appropriate to determining periods for maintenance, and obtaining other information as to the functioning of the equipment. Cleaning ports could be especially useful in situations in which a wide variety of debris was to be transported. Some forms of debris, especially fibrous material might have a tendency to accumulate on surfaces or leading edges. Surfaces could be shaped to reduce this effect, as is discussed elsewhere in this patent application. However, the ability to inspect or perform preventive maintenance, as appropriate, could be desirable in systems in which this type of loading were anticipated.

YY. Over-Pressure Relief: Resealing in Debris Transport Systems

To protect the system against severe overloads, safety valves could be included. These could be resettable valves, which automatically closed when the overload had passed, or blow-outs of a form which allowed ready replacement after the emergency had passed. An example of such a safety valve is illustrated in FIG. 28. In FIG. 28, equiduct 500 passes into safety valve means 501, including powerful spring means 502 used to hold down a relief flap 503. After passing into this, the equiduct 500 continues on its way. Suitable joints are provided at both ends of 501, with appropriate force distributors 504 to avoid undesirable stress concentrations. This is an automatically resetting system, which closes itself after the emergency has passed. In order to facilitate reseating of the valve plate 503 in the event that conduit 500 caries debris, a screen 505 can be included which passes the valve seat 506 shortly before the valve plate 503 seats. In this way, a brief flow of filtered material could be made available to clear the valve seat 506 before plate 503 seats on it. Suitable indicators could be incorporated into such a valving system, to indicate remotely that an emergency release had occurred. For example, a position transducer 507 could be incorporated, which telemeters signals appropriately. Such telemetry systems for remote monitoring are discussed in more detail in my copending application *3.

ZZ. Gas Segregation

Figure 29:
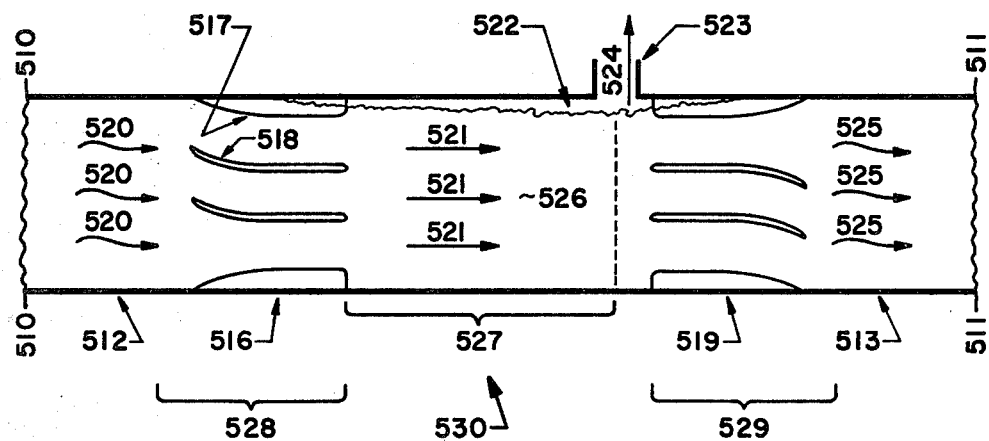
FIG. 29 is an elevation view of a gas segregation station in an equiduct system.

Were biologically active material passed within an equiduct for an extended period of time, biological processes occurring within this material could lead to evolution of a gaseous component. In order to allow most effective use of the equiduct cross section in carrying fluid component, the gaseous phase might advantageously be segregated at suitably spaced stations along the equiduct. As is discussed in more detail in my copending application *2, preserved gaseous phase could affect buoyancy or stability of buoyancy. The gaseous phase evolved by some fermentation processes is combustable and could be used as a source of energy, for example, for actuating flow augmentation means. In FIG. 29 is depicted a segregation station 530 connected to an equiduct system lying to the left and right of broken lines 510 and 511. Fluid enters in the direction of arrows 520. In the event that the normal operation of the equiduct used a swirling motion of the fluid to keep debris suspended in it, suitable deswirling blades 516 could be incorporated, having a curve 518, with respect to the axis of the equiduct, which served to convert swirling motion to linear motion. These blades could advantageously be contoured, as for example 517, to shed debris. Blades 516 are depicted schematically. A more intricate geometric configuration might be advantageous under some circumstances. Fluid leaving this deswirling apparatus would move in the direction of arrows 521. In region 528, flow of fluid in the equiduct would be conditioned to be in the correct form for the segregation process. In region 527, a gaseous phase would be allowed to rise from the liquid phase 526. This gaseous phase would accumulate near the top of the segregation station, forming a region 522 from which it exits through suitable conduit means 523 in the direction of arrow 524 subsequent to segregation region 527. A reconditioning region 529, includes appropriate means to recondition the flow of the fluid to that which is desired in the equiduct. For example, reconditioning region 529 is depicted as containing suitably contoured blades 519. These recondition the flow to the pattern indicated generally by arrows 525, corresponding to the general type of flow indicated by arrows 520 for the entering fluid. Region 512 and region 513 correspond generally to flow like that in other portions of the equiduct system. Conditioning stations 528 and 529 might be omitted, were the flow within the equiduct already suitable for use within the segregation station. This segregation station is generally designated 530.

AAA. Gas Segregation and Solids Transport

Figure 30:
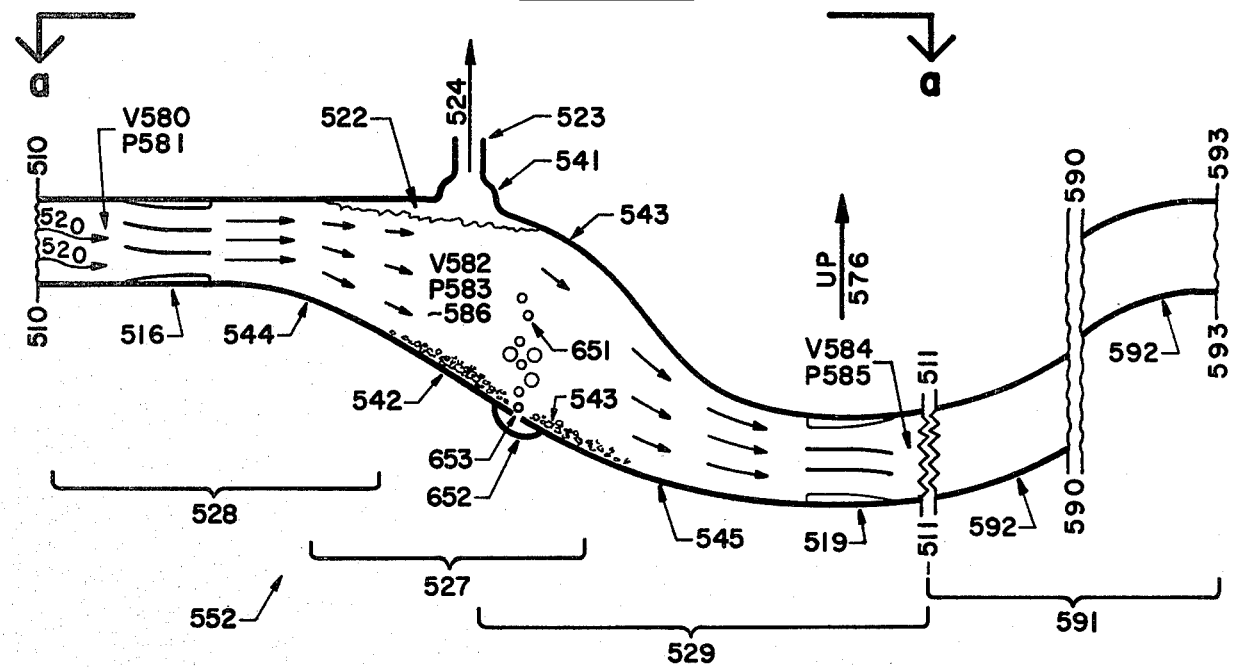
FIG. 30 is an elevation view of a gas segregation station having an optional manifold for feeding gas into the equiduct.
Figure 31:
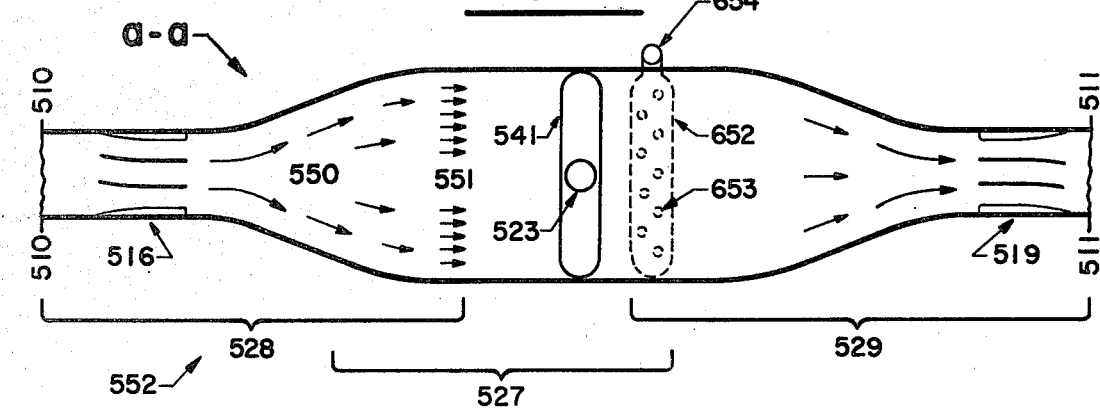
FIG. 31 is a view of the gas segregation station of FIG. 30 taken along lines a—a thereof.

In FIG. 30 is depicted a segregation station generally designated 552. View aa of the device in FIG. 30 is depicted in FIG. 31. The device 552 is generally intended for use in equiduct systems in which the velocity of flow of fluid would be sufficiently high to make effective segregation at that velocity relatively difficult. In FIG. 552, three general regions are designated: region 528 for adapting the condition present in the equiduct at entry to conditions generally appropriate for segregation of a gaseous phase; region 527 in which this segregation could occur; and region 529 in which the liquid component, with whatever suspended particulate matter were incorporated therein, would be reconditioned to the appropriate state for entering an equiduct to continue its flow. Entry would be from the left, beyond broken line 510, and continued flow to the right, beyond broken line 511. Arrows 520 generally designate the motion of fluid, entering in the state in which it moved within an equiduct. Vanes 516, as in FIG. 29, are optional, and might be included in the event that the flow within the equiduct were swirled. Such vanes could serve to assist in the recovery of swirling motion as linear (straight line) motion. In region 544 generally, the flow would diverge and its velocity be reduced and pressure increased. Entry velocity V580 and pressure P581 would be changed to lower velocity V582 and higher pressure P583 in region 586 of device 552. The velocity would then be restored at the expense of pressure, to exit state velocity V584 and pressure P585 just before entering subsequent euiduct located to the right of broken line 511. The direction of the vertical is designated by up arrow 576. In low velocity region 527, a gaseous phase would accumulate, designated 522, and enter a suitable plenum 541 which would gather it to an appropriate conduit means 523 through which it could exit in the direction of arrow 524. In region 527, reduction of velocity to allow the gaseous phase to be segregated upward also could allow debris which rises to be segregated upward, or that which falls to settle to the bottom 542. Because the difference in density between the fluid in the equiduct and a denser phase which settles from that fluid could typically be substantially greater than the difference in density between the fluid in the equiduct and a solid phase which rises with respect to that fluid, attention is given here to preventing the accumulation of settling debris within segregation means 552. For this reason, the bottom 542 of the relatively low velocity region 527, within which such segregation could occur, is contoured so that gravity would tend to feed any debris which might settle, here designated 543, into region 529 within which the recovery of velocity in the fluid would assist resuspension of such particulate material, to be transported from segregation station 552. Optional vanes 519 are illustrated, which could serve to restore a swirling motion, for example, in the event that swirling were used in subsequent equiduct connected to device 552. Note that if debris which tends to settle relative to the fluid in the equiduct were not at all a problem, but debris which tends to rise with respect thereto were, the flow of fluid within segregation means 552 could be reversed, so that the rising material tended to move along upper surface 543 towards the left end of the system where, with flow in the direction opposite to that shown by the arrows, the flow would regain velocity and resuspend such particulate material.

In FIG. 31 is shown view aa of apparatus 552. In this view, divergence region 528 and convergence region 529 are depicted as having spread both in the horizontal and, as shown in FIG. 30, in the vertical direction. In this way, a substantially greater increase in area in the divergence regions might readily be obtained, without having angles associated with such divergence great enough to substantially interfere with the effect of recovery of pressure, from the entry velocity; or at exit, recovery of velocity from the pressure within the segregation station. Broken lines 510 and 511 are as before, as are optional vanes 516 and 519. Region 528 depicts conditioning from the entry state to the segregation state for the fluid flow; 527, the segregation regions; and 529, reconditioning for flow into an equiduct; as before. Plenum 541 is shown as extending essentially the full width of station 552. Outlet conduit 523 of plenum 541 is shown as in FIG. 30. Arrows 550 generally designate the divergence of flow associated with passing through the divergence region, and the length of the arrows is intended to give a general approximate idea of the velocity of flow of fluid at various regions. Arrows 551 generally represent the achievement of a low velocity with substantially uniform flow velocity. The details of contour of surfaces utilized in device 552 generally could depend upon the flow characteristics required, the degree to which the velocity of the fluid flowing within the equiduct should be decreased in order to allow proper segregation of the gaseous phase, the nature of debris transported, the properties of the fluid transported, and possible considerations of installation and compatibility with other equipment. The equiduct exits from apparatus 552 at a different elevation from that with which it enters. A suitable restoration to the original elevation of the equiduct could be incorporated as an additional section within an apparatus of this general type. Region 591, containing suitable bend 592, shown here broken at broken lines 590, could restore the flow of fluid to the same elevation at which it entered, to exit the system past broken line 593. In the case of reversed flow, fluid would enter from the end to the right of broken line 593 and proceed to the left, to leave past broken line 510. Such reverse flow was discussed in connection with control of segregation and resuspension of debris which rises relative to the fluid.

BBB. Gaseous Phase Flushing and Gas Introduction for Solution

In FIG. 30 is shown an optional manifold 652 for feeding gas through hole 653 to rise as bubbles 651 within the fluid contained in gas segregation station 552. This gas would then rise to leave in the direction of arrow 524. In FIG. 31 gas distribution plenum 652, gas inlet holes 653 and gas feed line 654 are shown. One purpose for using such gas would be to flush from solution a gas which had a relatively high solubility, such as carbon dioxide. Air might be used as a flushing gas. Similarly, use of gas at such a location could allow aeration to increase the amount of components of air, such as oxygen and nitrogen, dissolved in fluid. Were oxygen enrichment specially desired, this process might be performed with relatively pure oxygen. Use of relatively pure oxygen allows, for the same absolute pressure of gas, a partial pressure approximately five times as great as that if air were used, because oxygen comprises only approximately one-fifth of the earth's normal atmosphere.

CCC. Gas Introduction and Solution at Depth

Air, oxygen, or other gas could be added to fluid in an equiduct at a substantial depth within a body of surrounding fluid. In this way, the absolute of pressure of the air present in the system could be increased to an extent sufficient to allow the partial pressure of oxygen to reach substantially higher levels than would be feasible if just normal atmospheric pressure were present. For example, an equiduct operating at a depth of approximately 136 feet in a surrounding medium of water would experience an external pressure approximately five times as great as atmospheric pressure, of which approximately one-fifth would be contributed by atmospheric pressure upon the top of the body of water, and the remaining four-fifths by the contribution of the increasing water pressure with depth. At such a depth, with such a pressure, air bubbled through a fluid medium would allow development of a partial pressure of dissolved oxygen in that fluid roughly comparable to that which could be obtained by bubbling pure oxygen through the fluid at normal atmospheric pressure. Thus, if a percolation system were used for aerating water or other fluid in an equiduct at a substantial depth, it would be possible to achieve effects similar to those achieved with pure oxygen, without requiring that pure oxygen be purified from the earth's atmosphere for such use. Alternatively, substantially greater enrichment with oxygen might be obtained, by using pure oxygen in an equiduct at a substantial depth. In that case, the partial pressure and solution which could be achieved would be roughly five times as great as that which would be achieved were air used, or approximately twenty-five times as great as would be achieved by percolation of air through the fluid at normal atmospheric pressure, for the example given.

Different depths and different gas compositions might be used, according to economic and technical requirements for the operation of the system, and according to the availability of water with various bottom depths in which such equiduct might be installed. Such gas percolation systems for flushing dissolved gases from fluid or for adding gases to fluid may be used with any of the configurations of gas segregation station presented in this patent application, and with other configurations which might occur to those familiar with the art of gas and liquid handling. Care might properly be exercised in selecting the operating points of equiducts carrying dissolved gaseous components or evolving gaseous material. This is discussed further in my copending applications *2 and *4. Instrumentation suitable for measuring the quantities of gas dissolved in a fluid within a equiduct, and the presence of a gaseous phase, are discussed further in my copending application *3.

DDD. Gas Segregation in a System: Gas Collection

Figure 32:
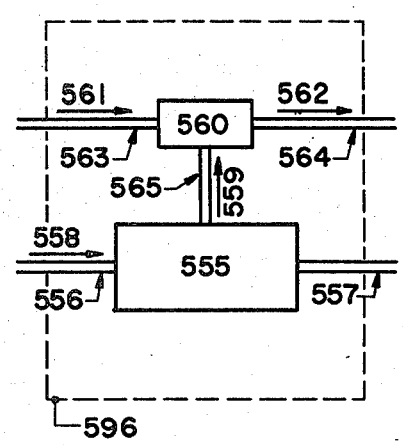
FIG. 32 is a schematic view of a gas segregation station.

In FIG. 32 is depicted a station for segregating gaseous phase 555, which fluid enters in the direction of arrow 558, through equiduct 556, and leaves through equiduct 557. The gaseous phase is separated and passed through suitable conduit means 565 in the direction of arrow 559 to an appropriate junction 650. In junction 560, gas entering in the direction of arrow 651 from conduit 563 has added to it gas entering from segregation station 555 to exit in the direction of arrow 562 through conduit 564. Junction 560 could include apparatus for pressurizing the gas segregated from station 555, if desired, or for augmenting the flow of gas entering in the direction of arrow 561. The technology for constructing gas pumping stations is well known in the art. Were the gaseous component segregated of a combustible nature, a suitable pumping station 560 might be actuated by combustion of a portion of the gas which it pumps. Such techniques are used, for example, in certain types of pumping stations used in pumping fuel gases. This entire segregation and gas handling station is generally designated 596.

EEE. Segregated Gas as Fuel for Pumping or Power

Figure 33:
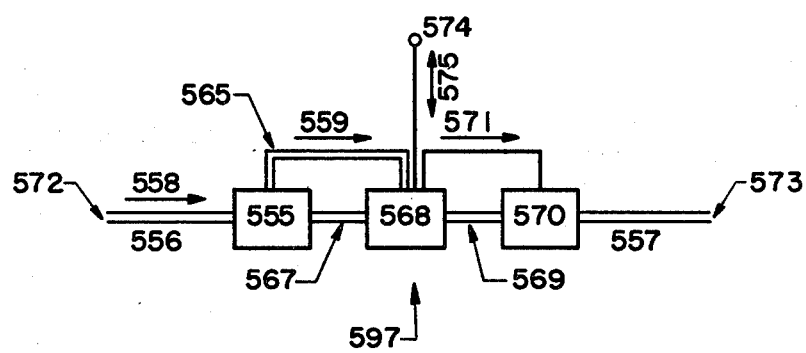
FIG. 33 is a schematic view of an alternative form of gas segregation station.

In FIG. 33 is depicted an alternative form of gas segregation station, in which a gas segregation station 555 is combined with a power generation station 568 and flow augmentation means 570. The flow augmentation means 570 and/or the power generation means 568 are optional. Fluid would enter at inlet 572 in the direction of arrow 558 through conduit 556 to pass into segregation station 555. Gaseous components segregated into conduit 565 would flow in the direction of arrow 559. The liquid component would leave segregation station 555 through conduit 567. Gaseous material would be utilized in power generation station 568, using any suitable means for converting the energy of a combustible fuel to a desired form of energy, e.g. to mechanical or electrical. Energy would flow in the direction of arrow 571 to actuate flow augmentation means 570. Liquid would pass from power station 568 through conduit segment 569 to enter flow augmentation means 570, from which it would proceed through conduit segment 557 to exit at outlet 573. Power generating station 568 is presumed to use fluid flowing within the conduit as the sink into which it rejects waste heat. One portion of the output could be electrical power delivered through terminal 574 to be used, for example, in other portions of a system. In the event that the amount of power which could be generated were variable, power might flow in both directions, as indicated by double-headed arrow 575. Power would be drawn from an external network when required as, for example, when the amount of combustible gas was not sufficient to actuate flow augmentation means 570, and could be delivered to such an external network in the event that excess power were produced. It is presumed that suitable conversion between electrical and other forms is performed either in power station 568 or in flow augmentation means 570, depending upon the detailed nature of the power handling system selected. For example, power station 568 might utilize a conventional gas turbine actuating an electric generator. This generator could feed power either to an external network or to flow augmentation means 570, or both. The external network could feed additional power to flow augmentation means 570, if required. In the event that an alternating current network were used, suitable phase control means known in the art could be incorporated for synchronizing the generator with the frequency and phase in the network. Were DC used in the network, suitable converters are known in the art for converting voltages and current for appropriate transfer of power in both directions. This overall station, including segregation means, power generating means, and flow augmentation means, is generally designated 597. To avoid polluting the atmosphere in the region around such a station with combustion products, these combustion products might be scrubbed in the power station, and the residue left from the scrubbing process transferred to the equiduct, leaving the system through outlet 573.

FFF. Segregating Inlet Gas

Gas segregation systems may also prove desirable to segregate gas entering the system at its inlets. For example, if a municipality feeds gas into an equiduct system from a multiplicity of storm drains, or other forms of apparatus by which gas can be entrained with a flowing liquid, a substantial portion of the total flow passing through the equiduct shortly downstream from such entries might consist of a gaseous phase. Efficient utilization of the capacity or control of the buoyancy of the equiduct under such circumstances, might be facilitated by the use of a suitable gas segregation station downstream from such intakes. For economic reasons, several such intakes might be fed together into a single gas segregation station.

GGG. Controlling Gas Outlet Ports of Gas Segregators to Avoid Liquid in Gas System For all such gas segregation stations, suitable gas monitoring means could be used, to assure that only gaseous phase is allowed to exit from the gas outlet port. Control might be desirable, because the fluid contained within the system may be under pressure and might have a tendency otherwise to exit through the gas exit ports. For many applications, simple float valves can be suitable for controlling the ports used for gas exit so as to prevent the exiting of a liquid component. In more elaborate systems, sensors could be used, which actuate control systems which may or may not be directly mechanically linked to the sensors. For example, electronic sensors could be used to detect the presence of a liquid, and actuate suitable solenoid valves to control air flow to actuate appropriate mechanical valves, to open and close in varying degrees the gas exit port(s). Such equipment represents a specific class of applications of sensors and servo-mechanisms which are known in the art.

HHH. Gas Segregation and Impact or Cavitation Wear Rate of Gas Evolution in an Equiduct Segregation of the gaseous phase might advantageously tend to reduce certain forms of wear within the equiduct system, by reducing the effects of impact associated with passage of bubbles followed by arrival of the trailing liquid behind the bubbles. The forces associated with impact or cavitation can be quite substantial. Reduction of the amount of gas transported with liquid in the equiduct might thus, under some circumstances, represent a way to increase the operating life of the equiduct. Were the buoyancy of the equiduct a significant parameter in the operation of the equiduct system, control of the amount of gas transported with liquid within the equiduct might be utilized in controlling the buoyancy of the equiduct plus contents. This is discussed also in my copending application *2.

III. Rate of Gas Evolution in an Equiduct

Several variables could substantially affect the rate at which gas might be evolved within an equiduct system. Some of the major variables appear to be the contents of the equiduct, the amount of time spent by these contents in the region from which gas is transported to a particular location, the biological processes which may occur within that region, and the temperature of the material. Special biological cultures might advantageously be introduced into equiducts carrying particular types of material, to perform particular forms of processing upon the material. One consequence of this could be the generation of usable fuel gas; another, the degradation of materials which might otherwise be more difficult to handle. Under many circumstances, the time spent within the equiduct could be sufficient to allow substantial amounts of processing to be performed on material within the equiduct system. For example, in an equiduct system which served to transport sewage from an entire river valley, portions of that sewage could spend several days within the equiduct system.

For some applications, product combustible gas might be regarded as a desirable commodity. In that case, suitable steps of dehydration or scrubbing could be performed, to make the fuel gas relatively pure. To increase the degree to which fermentation could degrade biological materials within an equiduct system, the temperature of the fluid within the equiduct system might advantageously be increased, for example, by using waste heat from power plants along the way, both those servicing the equiduct system, and also those producing electric power for other uses. For example, an electric power plant burning conventional fuel or operating from nuclear energy, which would otherwise utilize a river as a sink into which heat is rejected, might instead reject its heat into the equiduct system, increasing the mean temperature of fluid flowing therein. Suitable bacteria, possibly bred for high temperature activity, might then advantageously use the environment at the elevated temperature to degrade the biological materials at a substantially increased rate. This could have the advantage of reducing the amount of equipment required for subsequent processing of such material. This is discussed in my copending applications *4 and *5. Whether such heat were used specifically to advantage within the equiduct system or not, the equiduct system could be used for transporting heated fluids carrying waste heat from power plants, and assist gradual distribution of such heat into a river over an extended distance, reducing the biological effects of the heat introduction. One possible side effect might be that aquatic organisms would seek this heat. This could lead to encrustation of the equiduct, for example, with shellfish. However, the materials of construction of the equiduct could be selected to make it resistant to such effects.

JJJ. Entry Gates

Amount of gas entrainment from gravity feed entries into the equiduct system could, in some cases, be substantially reduced by proper grate design at the inlets. Also, suitable grates might properly be provided to prevent entry of the equiduct system of objects large enough to damage flow augmentation means, interfere with operation of valves or other control means, or otherwise interfere with the satisfactory operation of the equiduct system.

KKK. Controlled Buoyancy of Gas Segregation Stations

In general, suitable buoyancy control means could be incorporated in gas segregation station, as in other portions of apparatus to be used with equiduct systems. This could be advantageous, for example, were an equiduct system to be located at an intermediate depth within a body of fluid, neither close to the surface nor close to the bottom.

LLL. Location at Intermediate Depth to Reduce Disturbance of Other Installations Location of an intermediate depth could be advantageous for a variety of applications, including those in which there are substantial numbers of other installations located on the bottom of a body of water, such as cross cables, conduits, water distribution systems, tunnels, etc. In many busy harbors, and in rivers near metropolises, there are often a substantial number of such installations. Disturbance of such installations might be substantially reduced by choosing a position for the equiduct system neither close to the bottom nor close to the surface of the body of fluid. Under such circumstances, as has been pointed out elsewhere, both in this patent application and in my copending applications #2, *3 and *5, control of the buoyancy of the equiducts and other components of the equiduct system could substantially reduce the requirements for anchoring and support of the equiduct system, thereby reducing associated capital costs and maintenance costs.

MMM. Centrifugal Pumping Flow Augmentation Means

A second broad class of flow augmentation means may be developed based upon centrifugal systems. Such centrifugal systems may be utilized for flow augmentation and/or for flow retardation. For use in pumped water energy storage systems, such pumps and retarders have been developed to a high degree of refinement. Overall efficiency for coupling electrical to flow energy and flow to electrical energy is such that more than 70 percent efficiency of energy conversion can be achieved for either type of conversion. Because of the nature of centrifugal pumps, they can relatively easily be made relatively insensitive to the presence of debris in a fluid being transported, or to the presence of a gaseous component transported therewith. Thus, centrifugal pumps could be desirable in a wide variety of types of equiduct system.

NNN. High Pressures Readily Obtained: Slurry Transport

There are special advantages to centrifugal pumps when a large pressure differential is to be created in a small number of impellers. For example, impeller systems have been developed for use in pumped water energy storage facilities which can produce a pressure head in excess of 1500 feet of water using a single stage of pumping. Although it is relatively unlikely that such large pressure heads would be used in equiduct systems, the ability to produce a substantial pressure head could be desirable in systems with relatively small diameter transporting materials which require a fairly high flow rate to retain them in suspension, such as slurries. This could be of interest in the transport of solid wastes, for examples, from cities. In a tandem system utilizing one set of equiducts to carry relatively dilute materials such as raw sewage, and another equiduct system in tandem therewith to carry concentrated slurry, the equiduct(s) carrying slurry might have a different type of flow augmentation means from that carrying a relatively dilute material. In such a tandem system, the slurry transport system equiduct might utilize a flow augmentation means with sufficient pressure capability to allow the spacing of flow augmentation means in the slurry transport system to be approximately the same as spacing for the dilute transport system. In this way, the number of separate pumping stations connected in the tandem system might be reduced, simplifying mechanical handling.

OOO. Centrifugal Flow Retardation Means

Because of their nature of operation, centrifugal flow augmentation means do not lend themselves as readily to use both for flow augmentation and flow retardation with respect to flow occurring in the same direction through the flow augmentation means. For this reason, it may be desirable to use valving systems in conjunction with centrifugal flow augmentation means intended for use both for augmentation and retardation, to allow the flow of fluid to be reversed through the centrifugal means, while the flow in the equiduct system continued in the same direction. Valve means by which this might be implemented are described elsewhere in this application.

PPP. Example of Centrifugal Flow Augmentation Means

Figure 34:
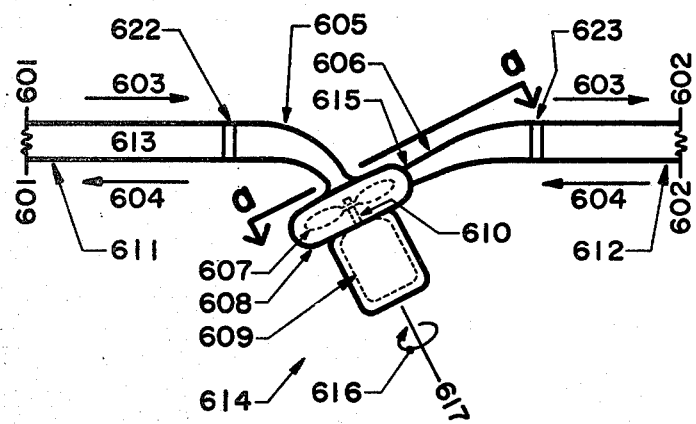
FIG. 34 is a schematic view of a flow augmentation station using centrifugal flow augmentation means.

In FIG. 34 is illustrated schematically a flow augmentation station utilizing centrifugal flow augmentation means generally designated 614. This station is shown between broken lines 601 and 602, and would presumably be included in a more extensive equiduct system beyond these broken lines. Fluid content 613 more in the direction of arrows 603. This fluid material would enter by equiduct 611 and pass through throat 605, which would convert some of its flow energy to pressure energy, and reduce the diameter of the flow to allow a smaller impeller 667 to be used for its flow augmentation. Impeller 667 is mounted on shaft 610 of motor 609 to rotate within housing 608 in the direction of arrow 616 with respect to axis 617 of shaft 610. Rotation in this direction causes fluid 613 to be accelerated radially outward and given a tangential velocity, directing it into tangential outlet 615 of housing 608. Tangential flowing outlet fluid passes through a diverging throat 606 to recover kinetic energy as pressure before entering equiduct 612. Fluid 613 would pass through throat 606 to leave the system in equiduct 612 in the direction of arrow 603. In systems which contain debris which can settle within the fluid 613, were its velocity reduced, special provision may be desirable in orienting flow augmentation means 614 with outlet 615 of housing 608 in such a position that debris would not tend to accumulate and clog rotation of rotor 607. Otherwise, such a system might be relatively difficult to restart after a period during which it had been stopped.

Figure 35:
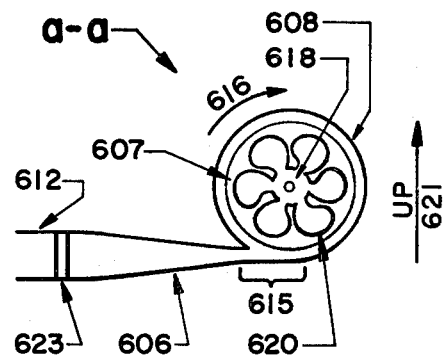
FIG. 35 is a view taken along lines a—a of FIG. 34.

In FIG. 35 is shown such an orientation relative to up arrow 62. Exit region 615 of housing 608 is located relatively near the bottom thereof and is connected to divergence throat 606 through which fluid moves to enter equiduct 612. Suitable connection means 622 and 623 are used to connect flow augmentation 614 into equiducts 611 and 612. Details of such connection means are set forth in my copending application *2. Impeller 607 rotates in the direction of arrow 616, and carries on it suitably configured blades 620 to transfer mechanical motion to fluid 613. These blades meet at a smoothly contained, common central point 618 in such a way as to leave no space for debris to become entrapped at the place where the blades join. This can be seen in FIG. 34 as a relatively streamlined central region, designated 618. FIG. 35 is view aa of FIG. 34. Referring again to FIG. 34, in order to extract energy from the flow of a liquid 613 utilizing a centrifugal system of this type, the flow desirably would be in the direction of arrows 604, so as to enter through suitable throat 606, which would now serve as a converging throat, and to leave through what would now serve as a diverging throat 605. Motor 609 could then serve as a generator. Detailed features of housing 608 and impeller 607, and appropriate converging and diverging regions 605 and 606 are intended for illustration only. Construction of centrifugal flow augmentation means and means for converting fluid energy to rotational energy utilizing such devices are known in the art. Other forms of debris shredding impeller, e.g., using an open central region and contoured blades may also be implemented, without departing from the scope of the invention as set forth herein.

QQQ. Partially Axial, Partially Centrifugal Flow Augmentation Means

Flow augmentation means can be constructed in which the motion of an impeller provides a partially axial and partially centrifugal motion to a fluid. Such combined forms of motion are known in the art of constructing pumps, compressors, and other flow augmentation means, and in the art of constructing turbines and other systems for extracting energy from the flow of a fluid. The art of constructing such devices is quite extensive. The discussion elsewhere herein concerns the diameters of inlets and outlets for such mechanisms. The pressure relationships and kinetic energy relationships are a property of the fluid dynamics involves, and in that respect, relatively independent of the detailed nature of the flow augmentation means used in conjunction therewith. Thus, for example, conduit means 612 and conduit means 611 may have different diameters. This might be the case, for example, if the purpose of adding the flow augmentation means were to increase the velocity of flow of the fluid rather than to increase just the pressure of the fluid for the same flow velocity.

RRR. Drag of Failed Centrifugal Flow Augmentor

Because centrifugal systems require a change in the direction of flow of the fluid passing therethrough, under some circumstances failure of such a system might give rise to a different amount of drag on a fluid flowing therethrough than might be associated with failure of the actuating mechanisms in an axial impeller system. This might affect the choice of spacing between such flow augmentation means in the construction of a safely augmented flow equiduct system.

SSS. Efficient Use of Space for Installed Centrifugal Flow Augmentation Means

Another consideration in the construction of flow augmentation stations utilizing centrifugal flow augmentation means is that the angular relationships among the inlet and outlet fluids with centrifugal flow augmentation may require a different utilization of space that that required for an axial flow augmentation system. In FIG. 34, flow augmentation means 614 is shown as offset with respect to equiduct 611 and 612. Converging and diverging nozzles 605 and 606 are shown as containing bends, so that equiducts 611 and 612 can be parallel and coaxial. Depending on the amount of energy to be added by flow augmentation means 614, the relative sizes of housing 608 and motor 609 might vary over quite a wide range. Under some circumstances, for example, it might be advantageous to incorporate motor 609 in impeller 607, were motor 609 sufficiently small relative thereto. In this way, the amount of transverse space required by flow augmentation means 614 might be reduced to a size roughly comparable to that associated with equiducts 611 and 612. In this way, a multiple equiduct system might not require a substantial increase in its total width for the incorporation of flow augmentation means. Such offset flow augmentation means as are shown in FIG. 614 might advantageously be staggered one from another in tandem equiduct system, so that the flow augmentation means in adjacent equiducts would occur at successive stages along the length of the equiduct, thus avoiding accumulating the total extra width of the multiple flow augmentation means at a single location along the length of the equiduct.

TTT. Flow Augmentation by Evolution of a Gaseous Phase

Figure 36:
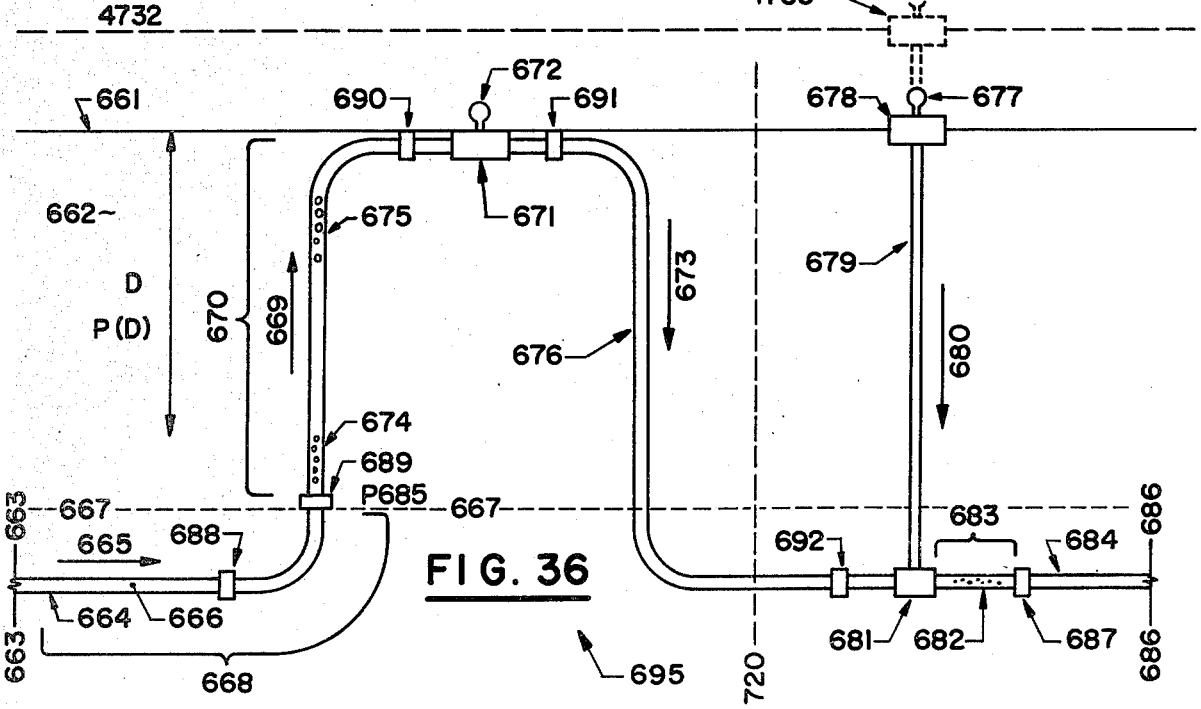
FIG. 36 is a schematic view of an equiduct system carrying fluid at several levels in a body of water.

In an equiduct located at a substantial depth within a body of fluid, an appreciable pressure could be exerted by the external medium. At this elevated pressure, gaseous material could be dissolved within the liquid within an equiduct to a substantially greater extent than at a reduced pressure. For this reason, there could be circumstances under which a substantial amount of gas evolution would occur when an equiduct carries liquid from a greater depth to a lesser depth within a surrounding body of liquid. In FIG. 36, body of liquid 662 with upper surface 661 has located, within it, equiduct 664 carrying fluid 666 in the direction of arrow 665 from some source located to the left of broken line 663. It is presumed that liquid 666 contains dissolved within it a substantial quantity of gas. In liquid 662, depth is labeled D, and there is a relationship between the pressure and the depth designated generically P(d). The amount of gas dissolved in liquid 666 is related to the pressure and temperature of the liquid in such a way that the pressure could be appreciably reduced before a gaseous phase was evolved. Then, in region 668 it could be expected that there would be liquid within equiduct 664, and essentially no gaseous phase. At a critical pressure, depending upon the partial pressure of dissolved gas within liquid 666, one would expect to see the beginning of evolution of a gaseous phase. This would occur at some depth within liquid 662. This depth is designated by dashed line 667. Corresponding to this depth is pressure P685 which, for the case under discussion, is presumed to be substantially equal to the partial pressure of gas dissolved in liquid 666. Above this depth, in liquid 662, the contents of equiduct 664 could be expected to consist of both liquid and gaseous phase. Thus, in region 670, we would expect that there would be bubbles contained, so that at location 674 we would expect to see relatively small bubbles within the liquid, and at a lesser depth 675 we would expect to see relatively large bubbles. The bubbles could increase in size by two mechanisms: One mechanism is that a decrease in pressure would allow that gas which already had been evolved to increase in volume. A second mechanism is that as the pressure decreased, more gas could come out of solution to enter the gaseous phase, adding additional gas to existing bubbles, and possibly also contributing new bubbles.

UUU. Rising Bubbles to Drag Liquid with Them

These bubbles would rise in the direction of arrow 669. Because such bubbles would typically be quite small, their rising would contribute to the rising of fluid within region 670. That is, fluid within region 670 could be viewed as having a mean density at each depth dependent upon the fraction which was in gaseous phase and the fraction which was in liquid phase. This density would typically be less than the density for the liquid phase alone at a corresponding depth. Thus, the presence of evolved gas within region 670 could contribute substantially to reducing the mean density of fluid contained within that region. This fluid might then, as a consequence of its reduced mean density, experience net buoyant forces tending to drive it also in the direction of arrow 669.

VVV. Gas Segregation to Remove Bubbles

Gas segregation station 671 would segregate the substantial portion of the evolved gas, to be disposed of in some suitable way generally designated 672. The gas segregation station could be any of a variety of segregation stations, e.g., as discussed elsewhere herein.

WWW. Liquid Return to Depth

From gas segregation station 671, fluid would progress in the direction of arrow 673 in substantially liquid phase. Thus, the contents at station 676 within equiduct 664 would be presumed to be essentially entirely in the liquid state.

XXX. Optional Gas Introduction

When the equiduct had reached the desired operating depth and resumed an essentially transverse position, an additional station could, if desired, be used, at which gas would be introduced to be dissolved within the equiduct. This is optional. A station 678 could be used for producing the high pressure necessary to drive gas, inlet, for example, from means 677 in the direction of arrow 680 through suitable conduit 679. This gas would then be introduced at station 681. Immediately downstream of station 681, in region 683, one would expect to find fine bubbles 682 gradually dissolving in the liquid within the equiduct. Subsequent to this, for example, at station 684, one would expect to see essentially entirely liquid contents within the equiduct, with the gaseous component having entered solution. This liquid then would continue to the right past broken line 686. Gas handling station 678 might include, for example, suitable compressor means. In the event that relatively purified gas were desired, some purification process might also be included therein. For example, suitable equipment for extracting oxygen from air might be included at station 678, to provide a flow of relatively pure oxygen to be introduced into equiduct 664 at station 681, to provide a higher partial pressure of oxygen in solution at station 684 that might otherwise be readily obtained. By selecting the amount of gas introduced at station 681 in relation to the amount of flow of liquid 666 within the equiduct, the partial pressure resulting after solution of a gas introduced could be chosen to be sufficiently less than the pressure at the depth at which the equiduct was located so as to assure that there be essentially no gaseous phase present within the equiduct. This can be desirable in controlling the buoyancy of the equiduct subsequent to the gas introduction and gas solution region. Such dynamic stability considerations are discussed further in my copending application *2.

YYY. Positioning Instrumentation and Control

Means for locating the equiduct within fluid 662 have been omitted from FIG. 36 for clarity. Many such suitable means are discussed in my copending application *2. Instrumentation for monitoring the contents of the equiduct and the performance of this system for augmenting the flow of fluid within the equiduct, segregating gas, and dissolving gas, in various combinations, can be provided by suitably located stations such as 688, 689, 690, 691, 692 and 687. The location of station 689 has been shown as placed at the critical depth at which gas evolution would be expected to begin. This is not essential. It could be located at some other suitable depth, depending upon the function which it was to perform. These various instrumentation stations could carry instrumentation of forms discussed in more detail in my copending application *3. Measurements made by such instruments could be used for controlling the functioning of the system. For example, measurements made at station 687 might be used in a control loop controlling the introduction of gas at station 781, for example, by controlling the functioning of gas handling equipment located in station 678. Measurements made by such instrumentation could include gas fraction present, partial pressure of dissolved gases, temperature, absolute pressure, and velocity of flow for materials within equiduct 664. Such measurements could then be used for various research and/or control purposes.

ZZZ. Gas Segregation in an Equipond

Gas segregation station 671 might, for some applications, be replaced by a suitable open chamber within which the gas segregation might occur, and within which other, e.g., biological, processes also might take place. Such configurations are discussed in more detail in my copending application *4. For example, such an open chamber might consist of an equipond of a type discussed therein.

AAAA. Advantages of Obtaining High Pressure in Equilibrium Vessels by Depth

The attainment of quite substantial partial pressures for dissolved gases within fluid within equiduct operating at an appreciable depth within a surrounding liquid would not require substantial strength in the walls of the equiduct. The partial pressure of the dissolved gas could advantageously be selected to be less than the normal operating pressure within the equiduct at that depth. Such normal operating pressure might exceed the ambient pressure surrounding the equiduct by an amount which was only a relatively small fraction of the total ambient pressure. It would not be necessary to utilize substantial quantities of pumping power to move the fluid within the equiduct up and down within the surrounding medium. Were the fluid within the equiduct and the fluid outside the equiduct to have substantially the same density, the amount of energy required to move fluid within the equiduct would be essentially that required to overcome frictional losses. Thus, it would be possible with an equiduct configuration, or other equilibrium chamber configuration, to utilize the desirable effects of substantial increases in partial pressure of dissolved gases without requiring the use of a pressure vessel capable of withstanding the partial pressure of the dissolved gas. This could be advantageous in many processes. For example, in certain biological processes involving aerobic microorganisms, for example, in the treatment of sewage, the increased partial pressure could allow a substantial increase in the rate of activity of such microorganisms. Also, increasing the temperature of a liquid typically reduces its ability to hold gases in solution. However, biological processes often can occur at an increased rate in a medium with increased temperature. Thus, in a situation in which the temperature within an equiduct were raised, for example, by means of waste heat which otherwise might constitute thermal pollution, the ability to sustain a very high partial pressure of gas at a selected operating depth could allow microorganisms to benefit from the increased temperature without suffering from a decrease in available supply of dissolved gases, such as oxygen. This is discussed further in my copending applications *2, *4 and *5. These same considerations of ability to operate with gas in solution at high pressure, without requiring that strong walls be used to retain internal pressure, apply to the utilization of equipods as vessels for containing such fluids. This is discussed further in my copending applications *2, *4 and *5.

BBBB. Flow Augmentation from Biological Activity Gas Product(s)

Biological processes occuring within fluid within an equiduct located at a substantial depth within a surrounding liquid might give rise to gaseous components which would appear in solution within the liquid in the equiduct. Provided that the partial pressure of these gaseous components did not exceed the pressure within the equiduct at that depth, no gaseous phase would be evolved. Thus, a gaseous phase may appear during the rise of a liquid within which such biological processes had occurred, without gas specifically having been introduced into such fluid by a gas introduction station. Depending on the rate and type of biological processes occurring, and depending upon the type of gas, amount of gas, solubility, temperature, and partial pressure, biological activity within an equiduct might give rise to this type of gas evolution flow augmentation effect, and thus reduce the amount of flow augmentation required to be supplied by other means. A system of the type discussed in connection with FIG. 36 could be used in conjunction with other flow augmentation means as appropriate.

CCCC. Control of Electrical Charge for Safety

Biological processes occurring in the absence of oxygen can give rise to gaseous products which are combustible, such as methane. Due care might properly be exercised in designing a gas handling system for use with such combustible gases. One design consideration which could appear in such gas handling systems is the effect of charge separation in water which is divided into a spray. Such charge separation can give rise to potential differences large enough to produce sparks which might ignite a mixture of combustible gas and air or oxygen. With proper design, such effects can be readily controlled.

DDDD. Gas Introduction Return Sometimes Unnecessary

It may not be necessary to have a return for gas introduced at gas introduction station 681. All of the gas introduced there might be dissolved within the liquid within equiduct 664. Thus, all that would be necessary would be to introduce a suitably divided stream of bubbles into the liquid.

EEEE. System Designation

For purposes of reference, 695 generally denotes the system in FIG. 36, including ascending and descending portions of equiduct, gas segregation means, gas handling systems and gas introducing means.

FFFF. Gas Introduction Station

In FIG. 37 is shown schematically a configuration appropriate to gas introduction station 681. Gas descending in conduit 679 would enter conduit 702 past broken line 701 and proceed therefrom into plenum 703, passing through many small holes 704 to enter equiduct 664 in the form of many small bubbles 705. The length 706 over which such bubbles were introduced to the fluid in equiduct 664 might advantageously be selected with consideration of turbulence and swirling of liquid within equiduct 664. For example, were fluid made to travel in a helical path, for example, by the use of helical fluting to provide swirling to prevent the settling out or rising out of debris of different density from the fluid, then the length of plenum 703 might advantageously be selected with relation to the axial distance required for a complete rotation in such swirling motion. If the rotation of the fluid within the equiduct through one full revolution occurred in a time short compared to the time required for bubbles 705 to rise an appreciable fraction of the diameter of the equiduct, then plenum 706 might advantageously be made approximately equal to the axial length within equiduct 664 required for one full revolution of fluid 666 to occur. In this way, gas could be introduced so as to have a relatively small travel distance required for it to contact various portions of fluid 666. This could have the desirable effect of tending to reduce the length of region 683 required for solution of the gas, thus reducing the length of equiduct 664 in which the density of the fluid was substantially affected by the presence of a gaseous phase. This could be desirable, for various reasons set forth regarding the effects of buoyancy in my copending application *2. Other forms of gas introduction station may occur to those familiar with the art of gas handling and liquid handling. Attention might properly be given to the desirability of using a gas introduction means which does not interfere with the transport of material within the equiduct. For example, were debris transported, the gas introduction means might be designed so as not to collect such debris nor be fouled by it, nor have its operation substantially interfered with by the presence of such debris.

GGGG. Deep Gas Introduction with Removal of Some of Gaseous Material

In FIG. 36, apparatus to the right of dotted line 720, is depicted for introducing gases into the contents of equiduct 664. Under some circumstances, a mixture of gases such as atmospheric air might be used for such purposes. Component gases may have different solubilities in fluid contained within the equiduct. For example, air contains primarily nitrogen and oxygen, of which the oxygen is appreciably more soluble in water than is the nitrogen. Thus, in order to achieve the maximum partial pressure of dissolved oxygen which would be consonant with aeration using normal atmospheric air at the pressure associated with the depth at which the equiduct is located, it would be necessary to have present in the air presented to the liquid by means of suitable aeration means, more nitrogen that could be effectively dissolved within the liquid. Thus, there could be an excess of nitrogen which might advantageously be removed. Thus, were atmospheric air to be introduced at a suitable aeration station, such as 681 in FIG. 36, region 683 might be adequately long to provide for the substantially complete solution of oxygen from the air, yet, at the end of that region, there might still be nitrogen which had not been satisfactorily dissolved, and thus present in gaseous form. For reasons discussed elsewhere in this application, and in my copending application *2, presence of such gas within an equiduct may be relatively undesirable. In FIG. 38 is diagrammed an alternative aeration means for use to the right of dotted line 720 in FIG. 36. Dotted line 720 appears also in FIG. 38, as does equiduct 664 and verious other portions of the system to the right of dotted line 720 in FIG. 36. An addition has been made: station 721 contains a suitable gas segregation means within which undissolved gas would enter duct 722 to move in the direction of arrow 723, returning it to gas handling station 678, which is again shown as located substantially at the surface 661 of surrounding liquid 662. For example, such a system might use the various gas introduction and gas segregation means depicted elsewhere herein, in order to introduce oxygen from air at a partial pressure substantially limited by the solubility of the oxygen in water, rather than limited by the availability of that amount of oxygen which could be carried by the amount of air whose nitrogen could be satisfactorily dissolved into the water. Excess nitrogen, left over because nitrogen is substantially less soluble in water than is oxygen, would be returned in the direction of arrow 723, through conduit 722. This flow of nitrogen at substantial pressure represents a substantial amount of power. For reasons of efficiency, this power might advantageously be reclaimed in gas handling station 678, thus reducing the total amount of gas pumping power required for satisfactory aeration of fluid within equiduct 664. Region 683, as before, denotes a portion of equiduct 664 within which fluid 682 could contain both liquid and gaseous phases. An additional instrument station 724 is shown in FIG. 38. This is optional and could be used for monitoring the performance of the system. Fluid 684, subsequent to gas segregation station 721, is presumed, as in FIG. 36, to be substantially liquid. Broken line 686 is as before. In order to allow the liquid within equiduct 664 to achieve its highest degree of oxygenation, a sufficient amount of oxygen might be provided so that the amount remaining in the gaseous nitrogen, which was undissolved, could be nearer equilibrium with the dissolved oxygen. Thus, equiduct 722, carrying gas returning to gas handling station 678, might contain quantities both of nitrogen and of oxygen, in the event that the aeration process used atmospheric air. However, the total flow of oxygen in duct 722 would be less than the total flow in duct 679. The difference would be the oxygen transported from the system in the direction of arrow 727, dissolved in liquid 684 within equiduct 664.

In FIG. 39 is diagrammed an alternative form of aeration station, also for use were an excess of a gas expected to be returned to the surface. In this diagram, all of the components are labeled corresponding to the similar labeling in FIG. 38. However, gas introduction station 725 now is of a type in which both introduction and extraction of gas can occur. For example, station 725 could contain an apparatus like apparatus 552 of FIG. 30. The comments made with respect to FIG. 38 concerning the contents and flows within ducts 679 and 722 apply also for FIG. 39. With gas introduction, solution, and segregation occurring all within station 725, there is no longer a region 683 within which equiduct 664 contains gaseous phase. Thus, following station 725 is depicted instrument station 687, at which equiduct 664 contains fluid substantially in the liquid phase, with substantially negligible gaseous component, which total fluid is designated 684 as in previous figures. In both FIGS. 38 and 39, the apparatus is presumed to operate below the safe operating depth 667, to insure that equiduct 664 immediately subsequent thereto will not experience gas evolution of a type which might lead to reduced efficiency or dynamic instabilities. This is discussed elsewhere herein, and in my copending application *2.

HHHH. Gas Introduction Ports and Means

Under some circumstances, suitably designed gas introduction devices might advantageously be used to facilitate introduction of gaseous material into solution in a liquid. Such devices might, for example, produce a large quantity of very fine bubbles so as to increase the surface area available for solution. For example, gas could be introduced under pressure through a porous medium. Many such porous media have been developed. For example, screen bonded together to form a relatively strong porous material has been used in introducing gas into fluidized beds of powder. Sintered materials are available with relatively well-controlled porosity, and could be suitable for such gas introduction. A multiplicity of fine, needle-like protrusions, with suitable apertures therethrough, might be used for introducing bubbles within the bulk of the liquid rather than merely at one surface. Thus, formation of relatively large bubbles might advantageously be reduced. Other techniques based on the use of mechanical or acoustical energy might advantageously be used to promote comminution of gas bubbles within the liquid phase. In some ways, such comminution processes are related to cavitation processes, such as are exploited in ultrasonic cleaning, and as are found at trailing edges of objects moving relatively rapidly through liquid. An additional effect which might be utilized is that of vortex production and vortex shedding, both within the liquid phase and the gaseous phase, so as to produce coupling between mechanical flow energy of the liquid phase or of the gas phase and swirling or oscillatory behavior of the combined phases. Such vortex behavior can often be characterized by a substantial shear of the liquid and gas phases. This shear might advantageously be used to break larger bubbles into many smaller bubbles, thus increasing their available surface area.

IIII. Flow Augmentation by Depth Changes at a Substantial Depth

Evolution of a gaseous phase, and flow augmentation thereby, could be obtained by changing depth substantially below surface 661 in FIG. 36. For example, the surface might be at dotted line 4732, with an intake 677 suitably positioned at 4733.

JJJJ. Equiduct for Gas and Liquid Contacting

If desired, region 683 of equiduct 664 in FIG. 38 could be constructed with reduced diameter or include suitable flutes or other means to induce substantial swirling within the fluid passing therethrough, so as to promote more effective mixing of gaseous phase with liquid phase. In a similar way, scrubbing of liquid by passage of gas through it could be performed relatively near the surface of a body of surrounding liquid by using an equiduct with gas injection at the beginning and gas segregation at its end. Such an equiduct could thus serve as an extended mixing and scrubbing chamber for the interchange of gas between a gaseous phase and a liquid material in which a gas is soluble.

KKKK. Miscellaneous Flow Augmentation Means

A variety of different flow augmentation means might be useful under different circumstances. It is anticipated that some of these would not be generally useful in systems in which efficiency of flow augmentation were a substantial consideration. Among these are the following:

(1) Jet Pumps-In a jet pump configuration, fluid is pumped by some auxiliary means and utilized as a jet to drive fluid within the equiduct. Such means have the advantage of being highly insensitive to debris transported within the system. They suffer the disadvantage of having relatively lower efficiency than centrifugal or axial impeller means. Such jet means might advantageously be employed where a natural source of water under high pressure were available, for example, in a region in which water could be brought under a substantial pressure head for use in augmenting flow within the equiduct. Where such a separate source of actuating fluid is utilized in a jet pump, the actuating fluid then becomes part of the fluid which must be subsequently transported within the equiduct. Thus, such augmentation processes could be relatively less satisfactory in an extended equiduct system in which many stages of pumping were used. Such a jet assisting technique satisfies the requirements of easy blow by in the event of failure of the flow augmentation means. Thus, jet pumps could be suitable as flow augmentation means for use in a safely augmented flow equiduct system.

(2) Piston Pump-Piston pumps could be used as a flow augmentation means in certain types of equiduct system. To make them safely augment a flow, suitable blow by valves could either be incorporated within the pump itself or provided as auxiliary equipment. Otherwise, failure of the piston pump might lead to excessive back pressure in preceding portions of the equiduct system. Piston pumps also can be relatively more susceptible to certain types of fouling by debris. Their efficiency is no better under most circumstances than that obtainable with centrifugal pumps. Because of their use of sliding surfaces and seals, piston pumps have the disadvantage of sustaining wear as part of their normal operation. A piston pump might be advantageously used in a system in which pumping were used occasionally, with a requirement of back pressure support in the event that the pump were not being operated. However, in equiduct systems, such a mode of flow augmentation could be expected to be needed relatively infrequently.

(3) Diaphragm Pumps-Diaphragm pumps can be thought of as a variant of piston pumps. Their ability to allow flow past them in the event of failure of the flow augmentation means depends upon the details of their valving, or upon the presence of suitable auxiliary bypass valves. Diaphragm pumps have the advantage over conventional piston pumps of being relatively less affected by the presence of debris transported within the pumped fluid. For example, diaphragm pumps have been used in pumping thick slurries, such as mud. For an equiduct transporting a thick slurry, such forms of pumping might be advantageous.

(4) Peristaltic Pumps-Pumps can be made using flexing of the wall of a flexible conduit in order to drive fluid axially along the conduit. Such pumps are sometimes termed peristaltic pumps, where the analogy is to the peristaltic motion used in biological organisms for transporting material, e.g. in the digestive tract. Such peristaltic pumps could be constructed in a way which would make them highly insensitive to the presence of many kinds of debris in slurry. Their principal drawback is the continual flexing of the wall of the conduit used as the flexed member in a peristaltic pump. This can impose undesirably short life limitations on such mechanisms. Blow by characteristics for peristaltic pumps depend upon the details of the mechanism by which motion of the conduit wall is induced. Thus, were such motion induced in a way which allowed the conduit to assume a sufficiently large cross section in the event of failure of the actuating mechanism, such a pump could have the intrinsic characteristics appropriate for a safely flow augmented equiduct system. Otherwise, suitable auxiliary valving could be provided.

(5) Surface Wave Pumps-Surface waves on a conduit surface can give rise to augmentation of the flow of fluid within the conduit. This can occur by means analogous to those by which the flow of fluid within a conduit can excite waves upon its surface. Waves propagating in the forward direction with a velocity greater than the flow velocity of the fluid within the equiduct might, under certain circumstances, give rise to an augmentation of flow within the equiduct. Under some circumstances, backward waves on the surface of the equiduct might also give rise to augmentation of the flow of the fluid in the direction opposite to the propagation of the waves. Such effects depend in detail upon turbulence and flow interactions occurring in the liquid in the equiduct, and the interaction of that liquid with the deformations of the walls. Such behavior can benefit from detailed analysis using numerical simulation on a high-speed digital computer. Effects of this general class are discussed much more extensively in my copending application *2.

Such wave motion of the equiduct could be induced by a wide variety of means. One means could be wave excitation systems, such as those discussed in connection with instrumentation for measuring the surface properties of equiducts and discussed in more detail in my copending application *3. Another method which might be used under some circumstances could be to enshroud the equiduct in an outer sleeve, with an annular gap between the equiduct wall and the outer sleeve, through which gap fluid would be forced by suitable flow augmentation means so as to excite waves on the surface of the equiduct, which waves could then, in turn, serve to augment the flow of fluid within the equiduct. Surface wave pumping techniques suffer from some of the drawbacks of peristaltic pumping techniques with respect to operating life associated with flexure of the wall of the conduit. Such flow augmentation means can be expected to be relatively insensitive to the presence of debris transported within the fluid within the equiduct. Typically, one would expect that failure of the wave excitation means would allow the equiduct to assume an essentially cylindrical cross section, within which a sufficient aperture would be present to allow passage of fluid. Thus, such a flow augmentation means would be expected to be suitable for use in a safely augmented flow equiduct system. Were a naturally occurring pressure head available to excite the flow of fluid in the annular region surrounding the equiduct, such a surface wave phenomenon might advantageously be used to transfer energy from this liquid to augment the flow of fluid within the equiduct, without introducing into the equiduct an additional burden of fluid to be transported.

(6) Water Turbine Actuated Pumps-Although, for specificity, the axial and centrifugal flow augmentation means discussed elsewhere herein, are depicted as actuated by suitable electric motors, other means for actuating their motion may be provided. For example, where a naturally occurring head of water is available, a suitable turbine or other water actuated engine could be driven by this head of water, and the resulting mechanical motion used to actuate suitable flow augmentation means of types discussed elsewhere herein. This has the desirable characteristic of allowing that portion of the system to operate without additional power beyond that occurring from natural sources, presumed to be located convenient to the operating site. Also, the complexity of such a system could be substantially less than the complexity associated with electric motors and other apparatus for use therewith.

(7) Heat Engine Actuated Pumps-Where a suitable source of fuel is available, heat can be used to actuate a suitable steam engine or other heat-operated engine, such as a Sterling cycle engine, in order to actuate the motion of suitable flow augmentation means. For example, under some circumstances, the material transported within the equiduct may give rise to combustible gaseous byproducts which might advantageously then be used in actuating flow augmentation means. Suitable gas segregation equipment, and a composite station using the combustible gases released by activities within an equiduct for power generation, are discussed elsewhere herein.

It is to be understood that the various flow augmentation means discussed above, and the various sources of actuating energy discussed in connection therewith, may be used various combinations, or in combination with other flow augmentation or flow impeding means discussed elsewhere in this application and my copending applications *2, *3, *4 and *5, without departing from the scope of the invention as set forth herein.

LLLL. Defouling by Water Jet

In some applications, a surface which is oriented so as to intercept debris, might accumulate stringy debris. For example, the leading edge of a split in which fluid is divided to flow through two ducts typically would not present a gentle angle to the material approaching it. Such a split could become fouled with stringy debris, which extended partly into one of the branches, and partly into the other. In the event that a multiplicity of branches were used, a complicated leading edge for the splitting surface could be presented to the fluid, and could have substantially greater likelihood of fouling than would the anti-fouling edges discussed elsewhere herein for use as leading edges of impeller blades and supporting housings. Because there is no way for such a leading edge to shed debris from an open end, other provisions might advantageously be made for occasionally removing such debris. For example, a suitable distributing conduit might be included within these leading edges, to allow jets of fluid to be ejected from the leading edge to drive from its debris which had impinged upon and remained upon that edge. Also, access ports might advantageously be included so as to allow suitable cleaning equipment or crews to enter to clean those edges. Because much of the functioning of an equiduct system could require merging material into larger flows, such splits could be relatively infrequently used. Their primary use in a multiple conduit equiduct system might be at the valving stations by which flow could be directed into various equiducts. In such stations, however, access might be made relatively simple. For example, were a slide valve used, the portion of the valve which would otherwise serve to blank off one or the other of the equiducts could have a suitable hatch contained therein to allow access into the valve. Thus, such fouling, if it occurred, is anticipated not to present an unacceptable maintenance problem.

MMMM. Varying Flow Velocity

Under many circumstances the velocity of flow of fluids within a safety augmented equiduct system may vary over a substantial range. In the event that solid material is transported therewith, it may be advantageous to occasionally have the fluid flow at a velocity sufficiently great to suspend and transport solids which might otherwise accumulate within the equiduct system. It is not necessary that fluid always flow above this velocity. The faster fluid flows within an augmented flow equiduct system, the more flow augmentation energy is required per unit fluid transported. Thus, economic considerations relating to the cost of providing flow augmentation may lead to choice of an operating mode in which the velocity of flow of the fluid is normally quite low, and in which it is increased above the level required to resuspend and remove debris only occasionally. For example, were a multiplicity of conduit used in tandem, flow might normally be divided evenly among all of them. In order to resuspend debris and remove it from each, all of the flow might occasionally be directed through a single duct. In this way, the velocity of flow within that duct could be increased. This choice of operating mode could be used to reduce the total amount of pumping energy. For other reasons, such as safety in the event of failure of components of the system, such excess capacity might be provided. Using this excess capacity under normal operating circumstances might reduce the cost of pumping. This reduction in pumping cost might then be used to amortize part of the cost of having the excess capacity for handling peak loads or emergencies. As is discussed in my copending application *4, excess capacity might be used to replace the flow velocity, for example, to help biological processing to be more completely performed within a shorter length of equiduct. This and other attributes of such choices of, or variations in, flow velocity are discussed in more detail in my copending applications *4 and *5.

NNNN. Optional Inclusion of Junctions

It is to be generally understood that suitable junctions in equiducts, and between equiducts and other apparatus used together with them in forming equiduct systems, may be incorporated wherever appropriate. Although such junctions may not be explicitly shown in the various figures in this patent application, it is to be understood that such junctions may be incorporated without departing from the scope of the invention as set forth herein. Suitable junctions are discussed elsewhere herein.

VII. SUMMARY

In this patent application, I have set forth ways in which a safely flow augmented equiduct may be achieved and ways in which flow augmentation, control of contents, introduction of contents, and control of flow may be implemented.

The various embodiments set forth herein may be used in various combinations, and may be used together with other system components, for example as set forth in my copending applications *2, *3, *4 and *5, without departing from the scope of the invention as set forth herein.

What is claimed is:

1. A safely augmented conduit system comprising: a conduit positioned within a body of water, said conduit having a flexible wall adapted to maintain the contents of said conduit in substantial pressure equilibrium with said body of water; and flow augmentation means within said conduit to augment safely the flow in one direction, along through said conduit without causing substantial departure from said pressure equilibrium, said flow augmentation means to augment including means permitting flow of said contents therepast in the event of failure of said means without substantial departure from said pressure equilibrium.

2. The conduit system of claim 1 wherein the pressure within the said conduit is maintained slightly above the pressure in the said body of water, so that the said conduit maintains an expanded shape.

3. The conduit system of claim 1 wherein a lower position of the said conduit is filled with a ballast material to position it on the bottom of the said body of water.

4. The conduit system of claim 1 wherein the internal surface of the said flexible wall is provided with a helical flute to impart a swirling motion to liquids and solids passing through said conduit.

5. The conduit system of claim 1 having a plurality of flow augmentation means positioned along the length thereof.

6. The conduit system of claim 1 wherein said flow augmentation means includes a by-pass line having a one-way valve positioned therein to permit by-pass of said flow augmentation means in the event of failure thereof.

7. The conduit system of claim 1 wherein said flow augmentation means comprises an axially positioned impeller having an open outer area for shedding of debris.

8. The conduit system of claim 7 wherein said impeller is contoured to promote shedding of debris.

9. The conduit system of claim 7 wherein said impeller is provided with bumpers to shed debris.

10. The conduit system of claim 1 wherein the conduit wall downstream of said augmentation means is adapted with flow direction means to convert swirling motion to axial motion.

11. The conduit system of claim 1 wherein said augmentation means is positioned within said conduit in a region thereof expanded to aid in entrainment of solids in the fluid passing through said conduit.

12. The conduit system of claim 1 wherein said augmentation means is located within a housing having clamped thereon a well to permit removal of a said flow augmentation means without polluting said body of water in which said conduit is located.

13. The conduit system of claim 1 having pressure sensing and control means positioned within said conduit and associated with said augmentation means.

14. The conduit system of claim 15 including means communicating pressure conditions within said conduit to preceding flow augmentation means.

15. The conduit system of claim 1 including a sliding valve for shunting the flow from one supply conduit to one of several effluent conduits.

16. The conduit system of claim 1 including buoyancy control means for controlling the position of said conduit in said body of water.

17. The conduit system of claim 1 wherein said flexible conduit wall contains a section of reduced flexibility so that it is relatively insensitive to large changes in pressure conditions within or without.

18. The conduit system of claim 1 including means for recovering energy from the liquid flowing within said conduit.

19. The conduit system of claim 18 including a decreased throat area and a plurality of impeller blades rotatably positioned therein and coupled to energy generating means.

20. The conduit system of claim 1 including means to flush debris collected on said augmentation means.

21. The conduit system of claim 1 including a zone at an upper part thereof for segregation of gases contained in the liquid passing through said system.

22. The conduit system of claim 21 including means for introducing a gas into said conduit.

23. The conduit system of claim 22 wherein said gas is oxygen.

24. The conduit system of claim 21 further including means for segregating gases out of said conduit and for using said gases to generate energy through the combustion thereof.

25. The conduit system of claim 7 further comprising means for carrying out biological reaction processes in said conduit.

26. The conduit system of claim 1 wherein said conduit is positioned at an intermediate depth above the bottom and below the surface of said body of water.

27. The conduit system of claim 1 wherein the flow in said conduit is augmented by evolution of a gaseous phase within the liquid in said conduit.

28. The conduit system of claim 1 including lengths thereof positioned at varying depths within the said body of water to take advantage of the different pressures at those depths.

29. The conduit system of claim 1 including means for introducing a gas into said conduit under pressure and for removing gas from said conduit and recovering the pressure energy in it.

30. The conduit system of claim 29 including means for mixing the gas and liquid in said conduit.

31. A safely augmented conduit system for conducting a municipal and/or industrial waste stream therein through a body of water without substantial risk of pollution thereto, comprising:
a conduit positioned within a body of water, said conduit having a flexible wall adapted to maintain said waste stream in substantial pressure equilibrium with said body of water; and flow augmentation means to augment safely the flow, in one direction, along through said conduit without causing substantial departure from said pressure equilibrium, said flow augmentation means including means permitting the flow of said waste stream therepast in the event of failure of said flow augmentation means.

* * * * *